(12) United States Patent
Chase

(10) Patent No.: US 11,396,828 B2
(45) Date of Patent: Jul. 26, 2022

(54) HEAT AND POWER COGENERATION SYSTEM

(71) Applicant: Practical Solutions LLC, Nashua, NH (US)

(72) Inventor: Dylan M. Chase, Boscawen, NH (US)

(73) Assignee: Dylan M. Chase, Nashua, NH (US)

( * ) Notice: Subject to any disclaimer, the term of this patent is extended or adjusted under 35 U.S.C. 154(b) by 100 days.

(21) Appl. No.: 16/816,424

(22) Filed: Mar. 12, 2020

(65) Prior Publication Data

US 2020/0292240 A1 Sep. 17, 2020

Related U.S. Application Data

(60) Provisional application No. 62/849,701, filed on May 17, 2019, provisional application No. 62/817,918, filed on Mar. 13, 2019.

(51) Int. Cl.
*F01K 17/02* (2006.01)
*F01K 25/10* (2006.01)
(Continued)

(52) U.S. Cl.
CPC ........... *F01K 17/02* (2013.01); *F01K 9/02* (2013.01); *F01K 17/005* (2013.01); *F01K 17/04* (2013.01); *F01K 25/103* (2013.01); *Y02E 20/14* (2013.01)

(58) Field of Classification Search
CPC ........ F01K 17/005; F01K 17/02; F01K 17/04; F01K 17/06; F01K 25/10; F01K 25/103; F01K 13/006; F01K 9/02; Y02E 20/14
See application file for complete search history.

(56) References Cited

U.S. PATENT DOCUMENTS 3,857,244 A * 12/1974 Faucette .............. F03G 7/04
60/641.2
4,995,234 A * 2/1991 Kooy .................. F17C 9/04
60/648

(Continued)

FOREIGN PATENT DOCUMENTS

DE 102009053915 A1 5/2011
EP 3056694 A1 * 8/2016 ........... F01K 13/006
(Continued)

OTHER PUBLICATIONS

International Search Report and Written Opinion from corresponding International Application No. PCT/US2020/022367 dated Aug. 6, 2020.

*Primary Examiner* — Mark A Laurenzi
*Assistant Examiner* — Xiaoting Hu
(74) *Attorney, Agent, or Firm* — Lando & Anastasi, LLP

(57) ABSTRACT

Techniques for cogeneration of heat and power are disclosed. A cogeneration system includes: a conduit loop configured to carry a working fluid using a Rankine cycle; a valve system disposed along the conduit loop, including valves configured to manage flow of the working fluid through a chamber; a backflow vapor line disposed along the conduit loop, configured to direct working fluid in a gaseous state to the chamber, such that the working fluid in the gaseous state displaces working fluid in a liquid state in the chamber and the working fluid in the liquid state advances through the conduit loop without requiring a mechanical pump; and a heat exchanger disposed along the conduit loop, configured to extract heat from the working fluid and direct the heat to a practical use.

10 Claims, 19 Drawing Sheets

(51) Int. Cl.
F01K 9/02 (2006.01)
F01K 17/04 (2006.01)
F01K 17/00 (2006.01)

(56) References Cited

U.S. PATENT DOCUMENTS

| | | | |
|---|---|---|---|
| 2005/0193735 A1* | 9/2005 | Yatsuzuka | F04F 1/04 60/670 |
| 2007/0119175 A1* | 5/2007 | Ruggieri | F01K 25/06 60/649 |
| 2009/0277198 A1* | 11/2009 | Yamaguchi | F01K 7/16 62/118 |
| 2011/0051880 A1 | 3/2011 | Al-Mayahi et al. | |
| 2012/0102996 A1* | 5/2012 | Freund | F01K 25/00 62/238.4 |
| 2012/0240575 A1 | 9/2012 | Mori et al. | |
| 2014/0096521 A1 | 4/2014 | Held et al. | |
| 2017/0087973 A1 | 3/2017 | Gaither | |
| 2019/0153903 A1* | 5/2019 | Miller | F01K 17/04 |

FOREIGN PATENT DOCUMENTS

| | | | | |
|---|---|---|---|---|
| WO | 2007028938 A1 | 3/2007 | | |
| WO | WO-2011092705 A2 * | 8/2011 | | F01K 25/10 |

* cited by examiner

HEAT AND POWER COGENERATION SYSTEM

RELATED APPLICATIONS

This application claims the benefit of U.S. Provisional Patent Application Ser. No. 62/817,918, titled "Cogeneration System Utilizing $CO_2$," filed Mar. 13, 2019, and U.S. Provisional Patent Application Ser. No. 62/849,701, titled "Power Generation System Utilizing $CO_2$ and Systems Employing the Same," filed May 17, 2019, both of which are hereby incorporated by reference in their entirety.

BACKGROUND

For various reasons (e.g., financial and/or environmental concerns), energy providers and consumers often seek to improve energy efficiency. Cogeneration is one technique for reducing energy use and improving efficiency. Cogeneration processes generate electrical energy within the same system in which heat is produced or utilized. A typical cogeneration system includes a transport mechanism for transporting energy between a generation loop and a heating loop. For example, a working fluid (e.g., steam, water, glycol, or refrigerant) may flow through conduits. During transport, the working fluid may experience losses in phase change and/or through heat transfer to the environment. In addition, some working fluids may be hazardous, limiting their use to industrial and/or large-scale operations.

Approaches described in this section have not necessarily been conceived and/or pursued prior to the filing of this application. Accordingly, unless otherwise indicated, approaches described in this section should not be construed as prior art.

Summary

One or more embodiments include a cogeneration system that is efficient and employs non-hazardous fluids. A cogeneration system as described herein may be more efficient and/or operated at lower temperatures than prior cogeneration systems. Higher efficiency and/or lower temperature may be helpful in a variety of applications of power generation and conversion technology. In particular, a cogeneration system as described herein may be particularly suited to smaller-scale industrial, domestic, and/or residential applications. Some examples of such applications include, but are not limited to, automotive, solar, and portable power supplies.

A cogeneration system as described herein utilizes a working fluid, which may be carbon dioxide ($CO_2$), after pressurization by a pump and heating by a heat source. In such a pressurized and heated state, transfer of energy is highly efficient, as the working fluid is routed through a turbine-based (or other energy conversion device-based) generator with low loss relative to other gas/liquid turbine processes. Heat may be derived from a residential or other small-scale heating system and/or by a solar collector. Heat may also be removed from the system via a cooling coil that returns the working fluid exiting the turbine to a low-temperature and pressure state before being repressurized at the start of the cycle by a pump located upstream of the heat exchanger. A variety of alternatives and additions can be provided to the system to enhance efficiency and usefulness in various implementations described herein. In some embodiments, a mechanical pump is not required, and gaseous working fluid is used to displace liquid working fluid through a conduit loop.

In general, in one aspect, a cogeneration system includes: a conduit loop configured to carry a working fluid using a Rankine cycle; a valve system disposed along the conduit loop, including valves configured to manage flow of the working fluid through a chamber; a backflow vapor line disposed along the conduit loop, configured to direct working fluid in a gaseous state to the chamber, such that the working fluid in the gaseous state displaces working fluid in a liquid state in the chamber and the working fluid in the liquid state advances through the conduit loop without requiring a mechanical pump; and a first heat exchanger disposed along the conduit loop, configured to extract heat from the working fluid and direct the heat to a practical use. The working fluid may be carbon dioxide ($CO_2$). The practical use may include heating one or more of a residence and/or a vehicle. For example, the vehicle may be a car, boat, or recreational vehicle.

The cogeneration system may further include a second heat exchanger disposed along the conduit loop, configured to act as both (a) a condenser for the working fluid and (b) an evaporator for refrigerant in a refrigeration system. The cogeneration system may further include a third heat exchanger disposed along the conduit loop, configured to act as a condenser for the refrigeration system.

The cogeneration system may further include a heat source disposed along the conduit loop, configured to heat the working fluid to obtain the working fluid in the gaseous form.

The cogeneration system may further include a second heat exchanger disposed along the conduit loop, configured to exchange heat between the working fluid in the liquid form and ambient air.

Pressure in a vertically higher conduit loop may include lower-pressure, more dense working fluid than a vertically lower conduit loop comprising higher-pressure, less dense working fluid. The conduit loop at a one end of the valve system may be about two or more times the pressure in the conduit loop at another end of the valve system. For example, pressure at one end of the valve system may be about 1000 psi while pressure at the other end of the valve system may be about 2000 or more psi. In general, the system may run on pressures related to the heat provided and extracted.

The valve system may include at least two valves and at least two chambers.

In general, in one aspect, a cogeneration system for small-scale applications includes: a conduit loop, having $CO_2$ therein; a pump disposed along the conduit loop, configured to pressurize the $CO_2$ to obtain pressurized $CO_2$ and direct the pressurized $CO_2$ to a heat exchanger disposed along the conduit loop; the heat exchanger, configured to receive heat from a heat source and heat the pressurized $CO_2$ to obtain heated and expanded $CO_2$; an energy conversion device disposed along the conduit loop, configured to remove energy from the heated and expanded $CO_2$; and a cooling coil disposed along the conduit loop and configured to remove heat from $CO_2$ exiting the energy conversion device before the $CO_2$ reenters the pump. Alternatively, a working fluid other than $CO_2$ may be used.

The $CO_2$ may have an operating temperature of about 0-212° F. At least one of the pump and/or the energy conversion device may be connected to a reservoir that provides lubrication fluid to the pump and/or energy conversion device via one or more capillary tubes. The heat source may include at least one of a building heating system, a hot water heater, an engine, and/or a solar collector. The energy conversion device may include one or more of a turbine, a piston-based device, a gear motor, and/or a fluid-drive motor.

The cooling coil may be configured to selectively direct excess heat to one of a building interior and an external environment.

The energy conversion device may be operatively connected to an electrical generator that delivers power. The electrical generator may operate at about 5-50 horsepower. The electrical generator may deliver the power as electricity to a user, for example a residential user. The energy conversion device may be driven by at least one of the power from the electrical generator and a mechanical transmission operatively connected to the energy conversion device.

The cogeneration system may further include a controller configured to: obtain sensor data comprising at least one of temperature, pressure, and/or flow at one or more predetermined locations in the conduit loop; and control speed of the pump based at least on the sensor data.

The heat exchanger may include a coil enclosed by an enclosure adapted to receive heat from sunlight. The cogeneration system may further include an apparatus configured to regulate a degree of sunlight incident upon the coil, the apparatus including at least one of a focusing lens arrangement, a plurality of reflective panels, and/or a movable shade. The coil may be disposed on a surface of an electrically driven vehicle, and the cogeneration system may be configured to power batteries operatively connected to the electrically driven vehicle. The coil may be disposed on a surface of a vehicle that includes a living space, and the cogeneration system may be configured to perform one or more of: powering at least one of batteries and/or a drive motor associated with the vehicle; and/or selectively directing heat into the living space. For example, the vehicle may be a recreational vehicle or a boat. The heat exchanger may include coils arranged to receive heat from a locations around the vehicle, and the cogeneration system may be configured to selectively activate one or more of the coils based at least on heat detected adjacent to the coil(s).

At least one of the heat exchanger and/or the cooling coil may be configured to exchange heat with a geothermal heat pump system.

The pump and the energy conversion device may be operatively coupled to a common shaft and surrounded by a shared enclosure.

The heat exchanger may be operatively connected to a heating element that supplies supplemental heat to the heat exchanger. For example, the heating element may consume fossil fuel to provide a heating flame.

In general, in one aspect, a refrigeration system includes: a refrigerant evaporator configured to extract heat from a cogeneration system using a Rankine cycle to pump working fluid; and a refrigerant condenser operatively coupled to the cogeneration system. The working fluid may be carbon dioxide ($CO_2$).

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

I. System Hardware and Overview

Figure 1:
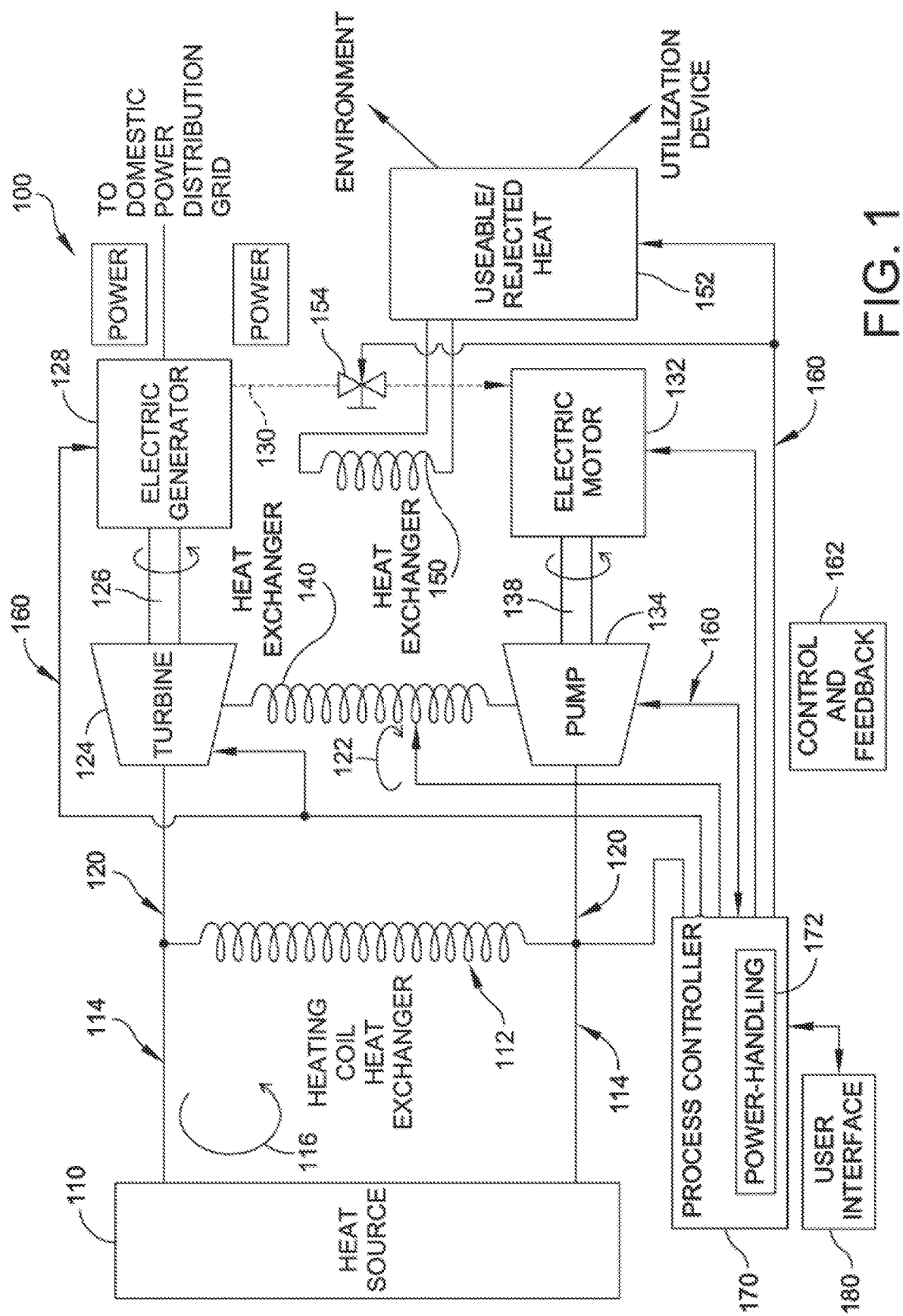
FIG. 1 is a block diagram of an example of a cogeneration system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. Multiple components may be combined into one apparatus. Operations described with respect to one component may instead be performed by another component.

As illustrated in FIG. 1, the system 100 receives heat from a source 110. The heat source 110 may be a boiler, passive or active solar array, compressor, air conditioner/heat pump exhaust, engine exhaust and/or cooling manifold, and/or another kind of heat-producing device or combination thereof. The heat passes into a heat exchanger 112. The heat exchanger 112 may be in direct contact with the source. Alternatively, heat may be transferred from the heat source 110 to the heat exchanger 112 along a loop 114, using water, glycol, refrigerant, $CO_2$ (described below), or another kind of working fluid. The direction of the flow (if applicable) is shown by the curved arrow 116. In general, the heat source 110 may be any device or system that generates excess or waste heat, from which additional energy may be derived.

The heat exchanger 112 is tied to a high-pressure loop 120. This loop 120 is filled with high-pressure $CO_2$, as described in further detail below. The $CO_2$ loop 120 flows as shown by curved arrow 122 and includes a turbine 124. The turbine 124 is configured to handle temperatures and pressures associated with $CO_2$. The turbine 124 is configured to receive heated, higher pressure/energy $CO_2$ from the heat exchanger 112 and extract energy in the form of rotational (or other) motion, which is delivered via a shaft 126 to an appropriately-sized electrical generator 128. The electrical generator 128 may be configured to produce domestic-level voltage/current (e.g., 12-240 VDC or VAC), which may be distributed to the power grid ad/or local distribution panel.

In an embodiment, part of the generated electricity is used (dashed arrow 130) to power an electric motor 132 of a pump 134 (e.g., an impeller unit), for example via a drive shaft 138. The pump 134 is also adapted to propel and pressurize the $CO_2$ at a range of operating temperatures and pressures (described in further detail below). The loop 120 includes a condenser coil or other form of heat exchanger 140 (e.g., a cooling coil). The heat exchanger 140 reduces the temperature of fluid exiting the turbine 124. Accordingly, fluid exiting the turbine 124 and/or entering the pump 134 may define one of a variety of phases, including transcritical, liquid, or gaseous. Fluid exiting the pump 134 generally defines the transcritical or liquid state, as described below.

In an alternate embodiment (not shown), the turbine 124 and pump 134 may be linked by a mechanical or electro-mechanical transmission, and/or may be disposed on a common shaft with appropriate gearing, clutches, etc. This mechanical transmission (not shown) may take the place of the electric motor 132 and electrical link 130 in such embodiments. Those skilled in the art will appreciate that various forms of mechanical linkage may be used. Additionally, a mechanical linkage system may be disposed within a common, integral housing for compactness and ease of replacement.

As illustrated in FIG. 1, the heat exchanger 140 is in thermal communication with another heat exchanger 150 that routes heat to be used (e.g., in home heating) or to the external environment. The heat exchangers 140, 150 may correspond to opposing sides of a single heat exchanging unit. Heat may be selectively directed for use or to the external environment. The heat exchanger 140 may be used as part of a domestic or institutional HVAC (heating, ventilation, and air conditioning) system. For example, the heat exchanger 140 may be a plate heat exchanger or another kind of fluid heat exchanger that transfers heat from the $CO_2$ to a fluid like water, glycol, or a refrigerant. A fan 154 may be configured to move air over the heat exchanger 150, to extract heat faster to the environment. Alternatively or additionally, the fan 154 may be provided to an external heat dissipation assembly 152 that is in thermal communication with the heat exchanger 150, as shown in FIG. 1. In this arrangement, for example, heat may be used to heat a dwelling during cold months and rejected to the external environment during warm months. One or more fan(s) 154 may be controlled for speed, to vary output. The speed(s) may be based, for example, on the temperature of the heat exchanger 150 and/or one or more other factors or a combination thereof.

One or more components of the system 100 may be operatively connected to actuators, sensors, and/or other telemetry-generating elements, via one or more data links 160. Such sensors may be used to monitor one or more of the pressure, temperature, power use/output, flow, and/or other properties of the components of the system 100. A data link 160 passes control and sensor feedback data 162 between the various components and a process controller and associated processor architecture 170. The controller 170 may be any custom or generalized processor(s) (e.g. an FPGA, ASIC, microprocessor, etc.) configured to handle data in accordance with a programmed control process. The controller 170 may include a power-handling module 172, which is configured to balance power input and output and adjust the pump and turbine accordingly (described in further detail below). The controller 170 may be communicatively coupled by a wired or wireless data connection to a user interface 180. The user interface 180 may be part of a tablet, smartphone, or other mobile device (e.g., including a touchscreen, microphone, camera, and/or other hardware for presenting information to a user and receiving user input). Alternatively, the user interface 180 may be part of a personal computer, laptop computer, or another kind of computing device. The controller 170 may be configured to provide data to the user interface 180 via a direct connection, a local network, a wide-area network, a cloud computing environment, and/or another kind of data connectivity infrastructure or combination thereof. Operational and performance data for the system 100 may be delivered to an on-site user and/or to a remote monitoring site (e.g., run via a manufacturer and/or subscription service).

II. Working Fluid Characteristics

In the example of FIG. 1, the $CO_2$ loop 120 includes components that are generally capable of operating at or around a pressure of at least 72.8 Bar (over 1000 PSI (pounds per square inch)), and within standard environmental temperatures (e.g., 0-212° F., or similar temperature ranges that are typically deemed safe in small-scale and/or domestic installations). Components of the $CO_2$ loop 120 may be adapted from components used in hydraulic applications and/or high-pressure steam applications, given the range of operating pressures.

Figure 2:
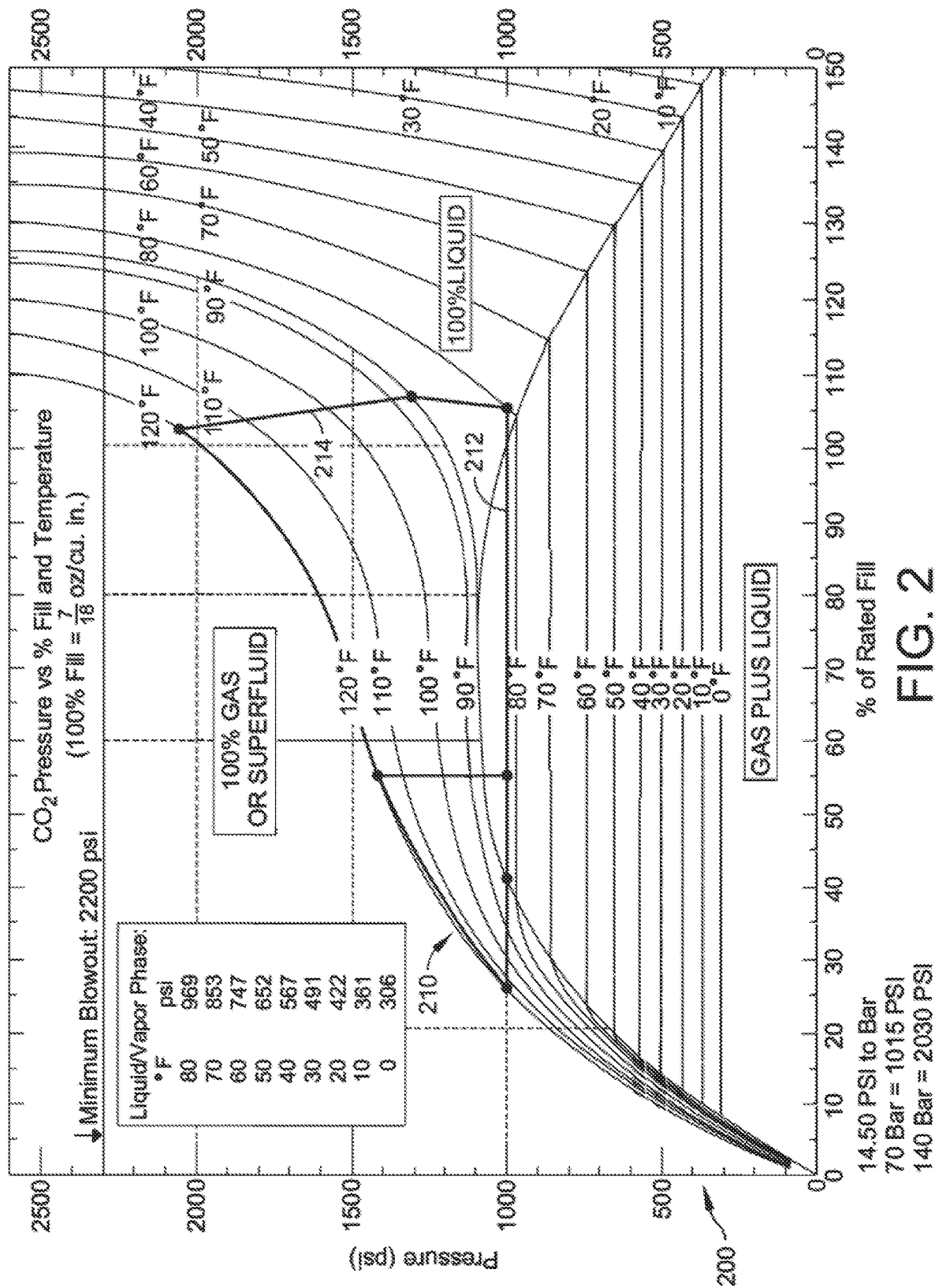
FIG. 2 illustrates a graph of pressure versus fill and temperature for $CO_2$ in various phases, according to an embodiment.

FIG. 2 illustrates a graph 200 of pressure versus fill and temperature for $CO_2$ in various phases, according to an embodiment. Specifically, the graph 200 shows the characteristics of $CO_2$ in differing pressure conditions. In addition, FIG. 2 shows the relative working range of the fluid as used in the system of FIG. 1. Within a range 210, the fluid shows desirable performance. In some cases, the fluid may be in a transcritical state in the range 210. The horizontal leg 212 of the range 210 shows the cooling region of the cycle, and the vertical leg 214 shows the evaporator or heat-transfer range. As illustrated in FIG. 2, the curves reside between 80 and 120° F. Pressure resides between 1000 and 2000 PSI.

Figure 3:
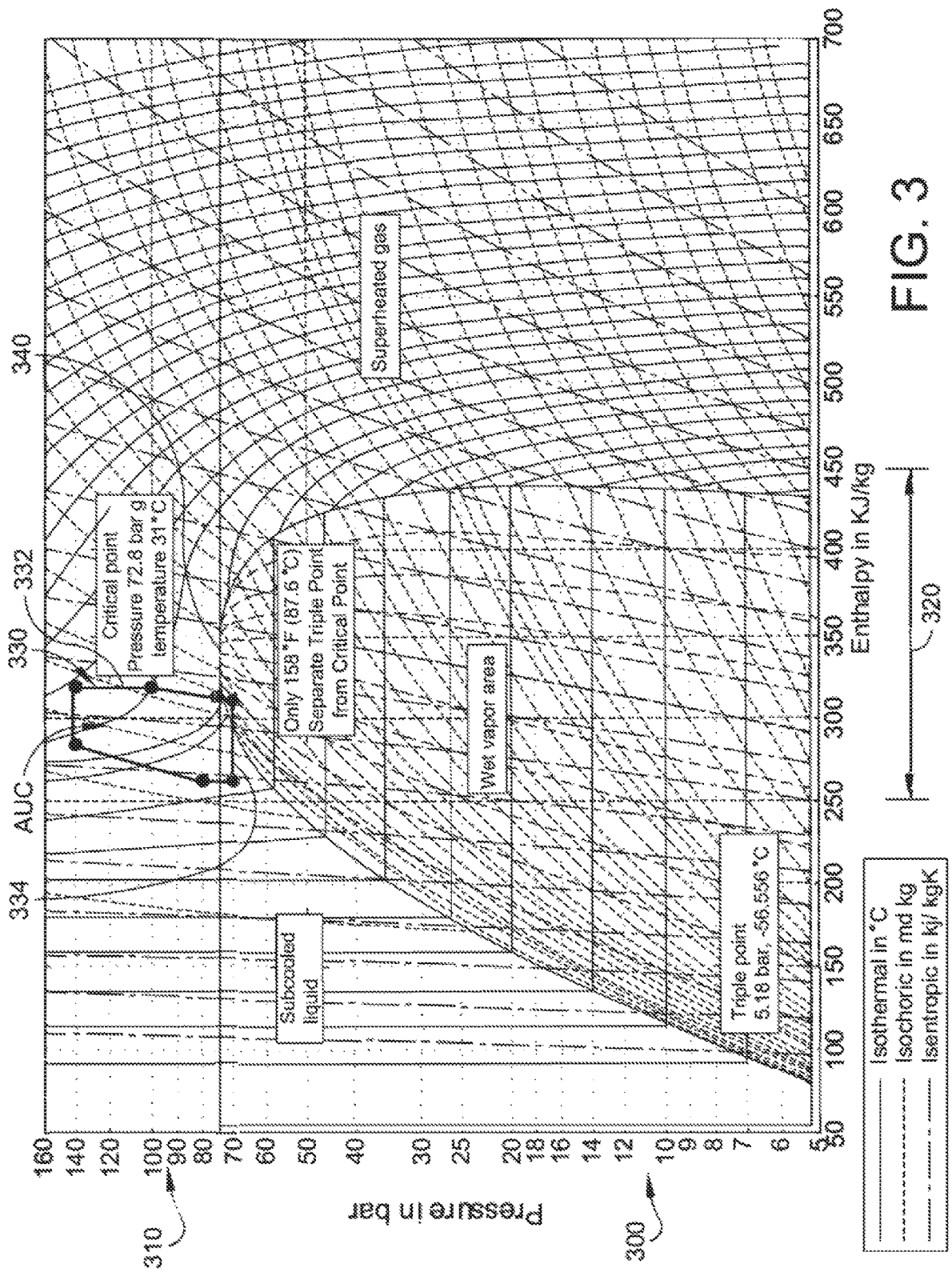
FIG. 3 illustrates a phase diagram of pressure versus enthalpy for $CO_2$ in various phases, according to an embodiment.

FIG. 3 illustrates a phase diagram 300 of pressure versus enthalpy for $CO_2$ in various phases, according to an embodiment. Specifically, the phase diagram 300 includes the transcritical phase, showing a generalized cycle used, for example, by the system of FIG. 1. The pressure is measured in Bar, and enthalpy relates to temperature (in kJ/kg) for $CO_2$ in various phases. The desired, temperature-related, operational range 320 is shown in FIG. 3. The operational cycle 330 is depicted within the region 310. The area under the curve ("AUC") represents available energy for a given pressure drop (e.g., 60 Bar) as fluid passes through the turbine. As illustrated in FIG. 3, the cycle 330 operates near the "triple point" 340 of phases. Additional features of the phase diagram 300 are discussed in further detail below with respect to FIG. 3A.

As used in FIG. 3, the term "isothermal" means that temperature remains the same while pressure and volume can change; the term "isochoric" means that volume is constant while pressure and temperature can change; and the term "isentropic" means that temperature stays the same. A turbine or compressor may run on an isentropic process.

Figure 3A:
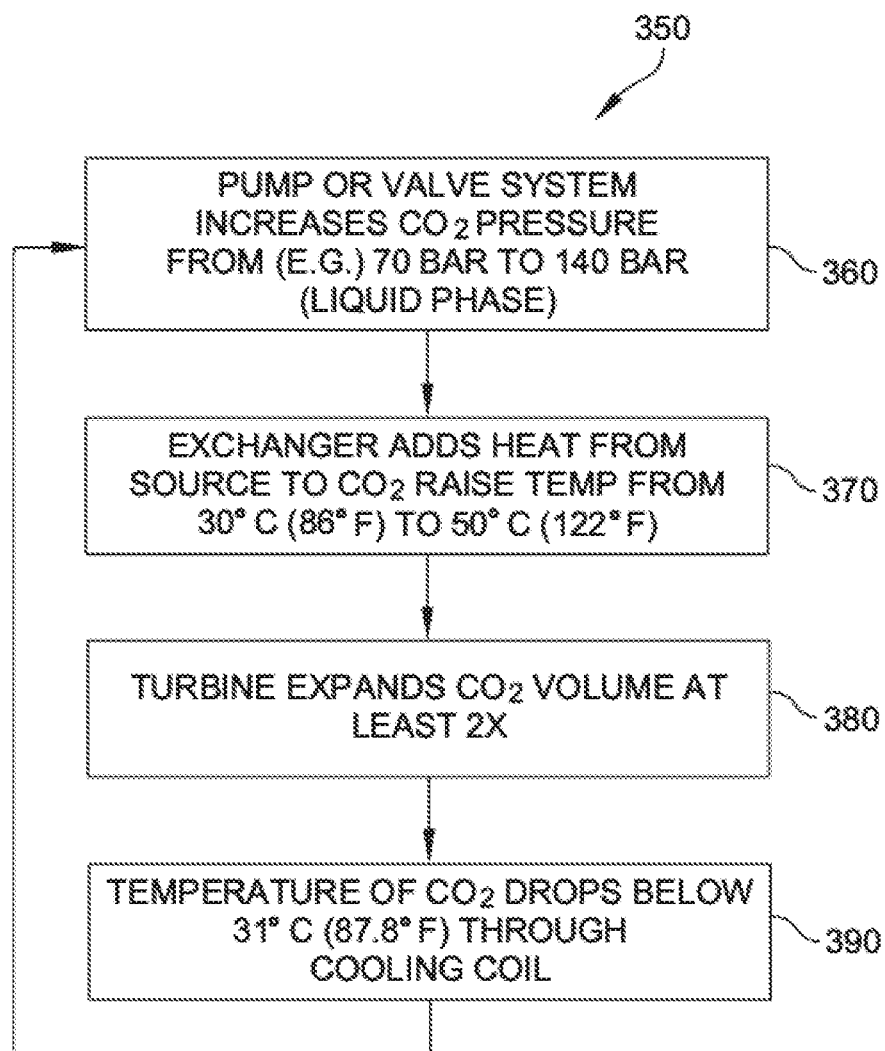
FIG. 3A is a flow diagram of an example of stages of a cycle according to an embodiment.

FIG. 3A is a flow diagram of an example of stages of a cycle according to an embodiment. The stages of the cycle may correspond to stages of the cycle 330 illustrated in FIG. 3, which are referenced here by way of example. Components of the system 100 illustrated in FIG. 1 are also referenced here by way of example. One or more operations illustrated in FIG. 3A may be modified, rearranged, or omitted all together. Accordingly, the particular sequence of operations illustrated in FIG. 3A should not be construed as limiting the scope of one or more embodiments.

As shown in FIG. 3A, the cycle 330 entails increasing the $CO_2$ pressure (Operation 360). For example, the pump 134 (or a valve system, as described in further detail below) may be used to raise the pressure from about 70 Bar to about 140 Bar. The pressurized $CO_2$ is then directed to the heat exchanger 112 (Operation 370), where the temperature is raised, for example, from about 30° C. to about 50° C. (86° F. to 122° F.). The resulting heated and expanded $CO_2$ experiences a pressure drop (leg 332 of the cycle), and its energy is transferred to rotary (or other—see below) motion via the turbine 124. The $CO_2$ may expand to at least twice its volume in this phase (Operation 380). The $CO_2$ passes through the heat exchanger 140 and its temperature decreases below 31° C. (87.8° F.) (Operation 390), taking the fluid slightly out of a transcritical phase as denoted by cycle leg 334. As illustrated in FIG. 3A, the process 350 is a repeating cycle. In some climates, the $CO_2$ may always be in a transcritical state, or may never been in a transcritical state. The range of state(s) of the $CO_2$ may depend, for example, on the temperature(s) supplied to one or more heat exchangers.

Figure 4:
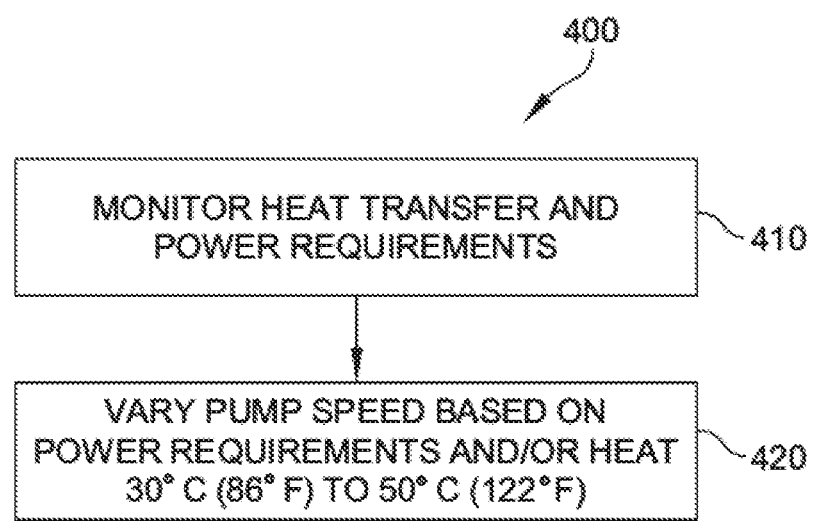
FIG. 4 is a flow diagram of an example of a power control and feedback procedure according to an embodiment.

FIG. 4 is a flow diagram of an example of a power control and feedback procedure 400 according to an embodiment. By way of example, the procedure 400 is described herein as being performed by components of the system 100 of FIG. 1. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, the control procedure 400 illustrated in FIG. 4 is performed using a controller 170 and sensors linked by data link 160, as illustrated in FIG. 1. The procedure includes monitoring, by the controller 170, at least one of heat transfer and power requirements (up to a maximum available power output) (Operation 410). This data is used to vary pump speed (Operation 420), for example by using a clutch on a transmission and/or varying electric power input to the pump motor. Local pressure may also be monitored and used to make control decisions, for example, based on the pressure difference across the turbine.

III. Implementation Details

Features of a cogeneration system as described above may be particularly useful for small-scale applications, where industrial conditions are not present and safety is a key concern in operation and maintenance. Such an industrial $CO_2$-based cogeneration system is shown and described (by way of useful background information as to the operational theory and principles of such industrial-scale systems) in U.S. Pat. No. 7,685,820, by Litwin et al., entitled SUPERCRITICAL $CO_2$ TURBINE FOR USE IN SOLAR POWER PLANTS, issued Mar. 30, 2010, the teachings of which are incorporated herein by reference.

By using $CO_2$ as a working fluid, a triple point of 87° F. can be achieved, which may be useful in cold-weather (e.g., winter) home-heating applications. More generally, the high side of the heating curve is above this triple point, while the low side of the heating curve is below this triple point. During warmer (e.g., summer) temperatures, the low pressure side would be slightly above or below the triple point, depending upon the outside (ambient) air temperature (as the heat is exhausted outside during warm months). Since heat is often derived from a solar heating source, efficiency is less concerning in this mode of operation, and thus a less-efficient outside exchange may be acceptable.

Additionally, many home heating systems (e.g., boilers) operate a water-heating cycle that is set at or above 140° F. In such applications, the hot water loop may be used as the source 110 in the heat exchanger 112 on the high side of the system. On the low side of the system, any residual heat not used to generate power may be either returned to the boiler on the cold side or exhausted into the interior space of the building (e.g. residence). In colder weather, the exhaustion of heat into the building supplements or replaces output from other heating equipment. In some examples, electricity may be generated at the approximate efficiency of the boiler during cold months when heating is used frequently. In addition, the boiler's combustion exhaust may be tapped for heat for use in the system (e.g., using an exchanger on its manifold and/or around the first few feet of the exhaust stack), thus improving overall boiler efficiency. This approach also allows exhaust heat to be used (indirectly) in heating the building in cold weather (via the heat exchanger, etc.).

Embodiments of the system described above are highly scalable, based upon the size of building serviced. In some cases, the system may be configured to satisfy all or nearly all anticipated power requirements. The system may also be supplemented with grid power, or other forms of local power generation (e.g., a conventional internal combustion driven generator). Changeover switches and load balancing circuits may be used to integrate multiple power delivery systems in a single building. These alternate generation systems may provide extra power when needed, or failover if and when the cogeneration system experiences a failure. To help ensure that appropriate power is available during peak use, the system may include a battery storage bank or similar electric storage device (e.g., ultracapacitors, etc.), allowing for intermittent system operation (e.g., to bridge the energy gap when a boiler is off). For example, two deep cycle or truck batteries may supply 16-20 kW over a short duration when energy use surges, whereas an average house may use 1-3 kW per hour on average each month.

In some examples, a solar heat collector (e.g., a passive solar heat collector) with circulating fluid may be dedicated to supplying heat for the system exchanger 112 during warm weather, when boilers are generally inactive. Changeover switches may be used to switch between boiler heat and solar heat.

In an embodiment, the general power output parameters of a small-scale cogeneration system described herein are between approximately 5 and 50 horsepower (hp), where 5 hp would likely serve a small fixed or mobile dwelling and 50 hp could serve a reasonably-sized light-industrial or commercial building space. Batteries and/or other energy reserve systems may be used to handle peak surges beyond specified output ranges.

In operation, the pressurization of the $CO_2$ loop(s) may range from approximately 500 PSI to approximately 3,500 PSI and within a typical operational temperature range of approximately (and not limited to) 0-212° F. This operational range is exemplified by the graph 200 of FIG. 2. Alternatively or additionally, a cogeneration system as described herein may use other operational ranges.

IV. Alternate Embodiments

In an alternate embodiment, the turbine 124 can be substituted with another form of energy conversion device, such as a sterling engine that passes pressurized $CO_2$ from the heat exchanger 112 through a reciprocating cycle that also drives the generator and/or pump. A variety of other fluid-driven motors may be substituted to drive an associated power generator, including gear motors, various impeller-based motors, etc.

V. Additional Power Cycle Parameters and Curves

Figure 5:
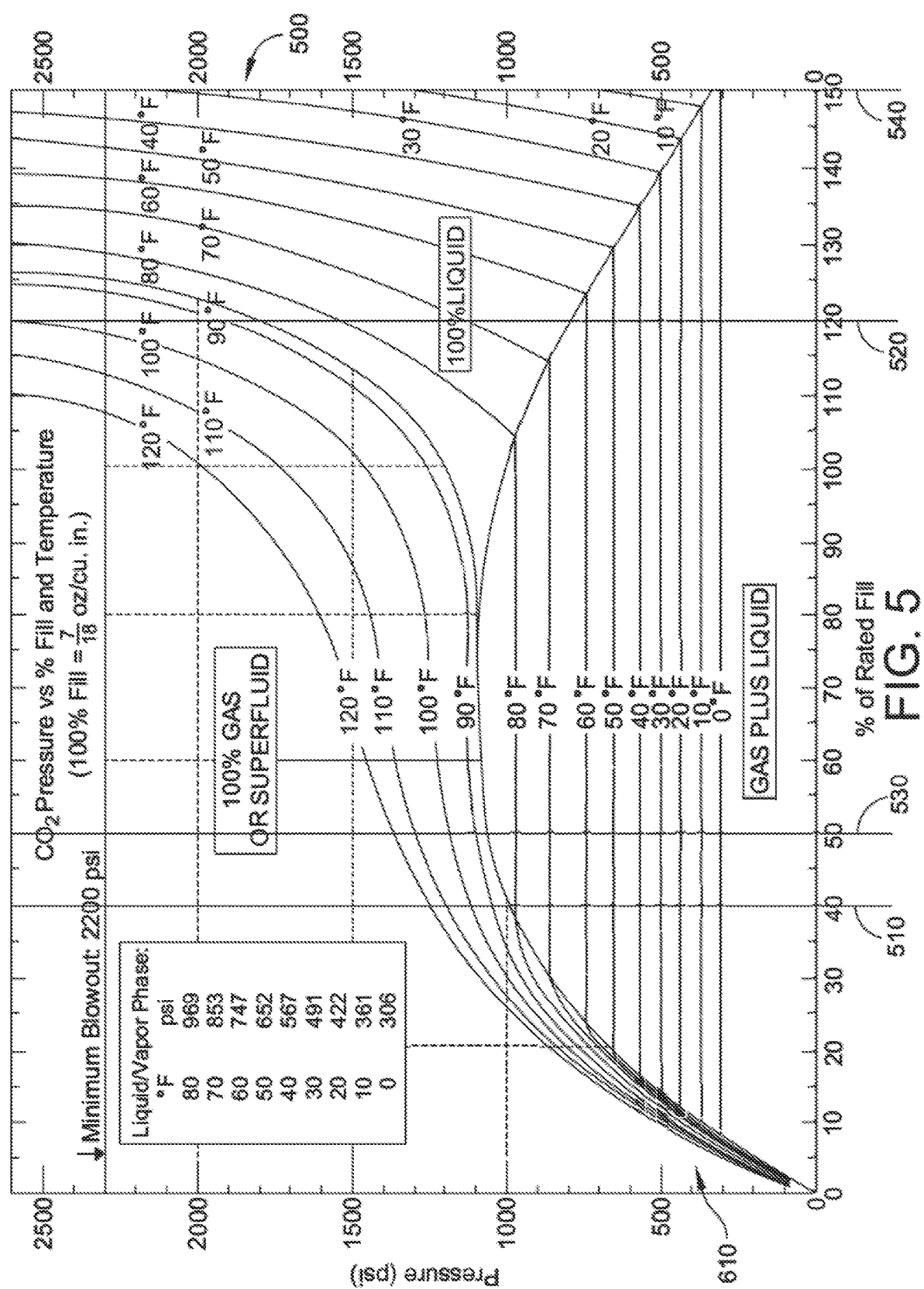
FIG. 5 illustrates a graph of pressure versus percent of rated fill for $CO_2$ in various phases, according to an embodiment.

FIG. 5 illustrates a graph 500 of pressure versus percent of rated fill for $CO_2$ in various phases, according to an embodiment. In addition, FIG. 5 illustrates an example of working temperatures for a system as described herein. Vertical lines 510 and 520 show a rate of fill ratio of 1 to 3, where line 510 marks 40% of the rate of fill and line 520 marks 120% of the rate of fill. Accordingly, in one example, a 1000-psi low-pressure condensing coil allows the high side to be at 3000 psi and in the range of 120° F. to 40° F. on the graph 500. The fluid may also define cooler temperatures (not shown) that would still condense on the low pressure side and evaporate on the high pressure side with only a 20° F. temperature differential, which would be useful for a system as described herein. The graph 500 suggests that an exemplary pump/motor with a set mechanical size difference may be configured to operate through multiple temperature ranges and produce a power output (e.g., via rotational torque or reciprocating piston force) to use for providing direct mechanical power or generating electric power.

The curves depicted in FIG. 5 allow for adjustable power cycles depending, for example, upon temperature. These adjustable power cycles may be achieved with one pump/motor or separate pump and motor that can be connected via a belt, chain, pulley and/or gear-based power transmission. In an embodiment, using $CO_2$ as a working fluid advantageously allows for a relatively large pressure difference within a small temperature difference. In one example, the condensing coil and piping may define approximately three (3) times the size of the evaporator and interconnecting conduits/piping (i.e., 1/3 ratio) to achieve this adjustable cycle. Within the working pressure and temperature range of $CO_2$ (which in some cases may be in a transcritical state), a dual acting pump/motor may be configured to operate with this fluid at many different ratios, depending on the task, and at specified the inlet and exhaust temperatures that are provided for the power generation system.

As illustrated in FIG. 5, vertical lines 530 and 540 (which intersect the various constant-temperature curves) indicate where a 1/3 ratio could function at 50% rate of fill and 150% rate of fill and still function at 1,000 psi low side and 3,000 psi high side. If the high pressure side were to receive excess, it would run the motor faster, thereby increasing low side pressure, which would then condense at a faster rate due to the increased pressure in the condensing coil. This configuration may enable the pump/motor to be self-controlled/regulated, depending on the temperature differential provided to the condenser and evaporator.

Figure 6:
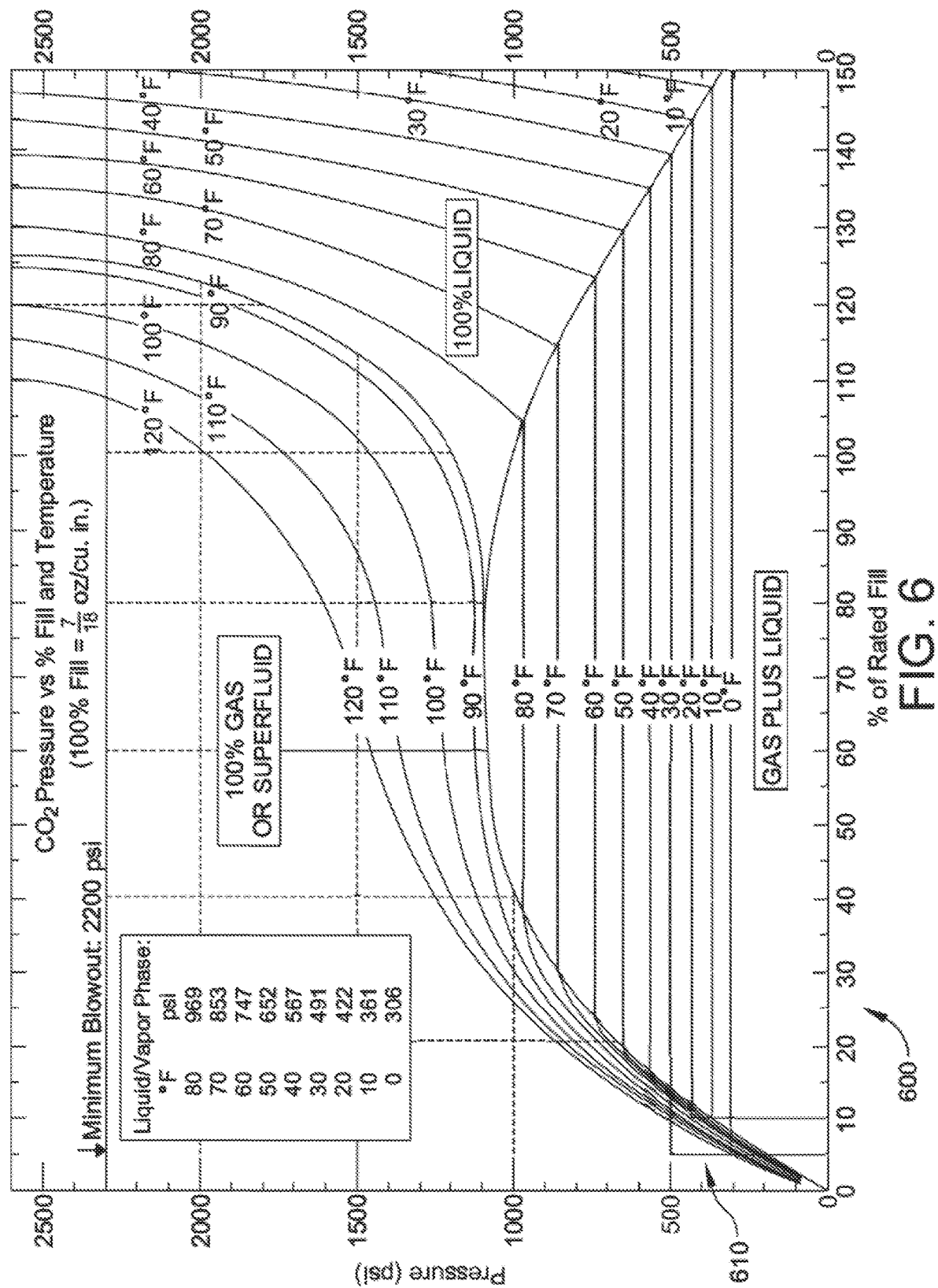
FIG. 6 illustrates a graph of pressure versus percent of rated fill for $CO_2$ in various phases according to an embodiment.

FIG. 6 illustrates a graph 600 of pressure versus percent of rated fill for $CO_2$ in various phases according to an embodiment. In addition, FIG. 6 illustrates working temperatures for a system as described herein. The graph 600 includes curves of constant temperature between 0° F. and 120° F. As shown by the Rankine-type cycle 610, $CO_2$ can reside in a system in which the pressure is maintained below approximately 500 psi. More particularly, a system in which pressure is below approximately 300 psi can operate in a temperature range of 0° F. to 100° F., at 5% of rated fill, making such a system well-suited to domestic and light commercial/industrial heating and/or cooling applications. This cycle may be used in various applications, as described in further detail below.

VI. Applications of a $CO_2$-Based Power Generation Cycle

The above-described $CO_2$-based power cycle may be used in a variety of applications, to provide a highly effective working fluid for heat transfer.

A. Combined (Dual-Acting) Vane Pump and Motor

Some prior pump and motor solutions require selected components that are chosen to most efficiently provide discrete pump and motor functions, connected by a belt transmission or chain drive. This arrangement decreases mechanical efficiency. Such solutions are thermally inefficient, because the pump generates heat as it compresses fluid, while the motor cools the fluid due to expansion. These two thermodynamic reactions occur separately in the same apparatus. Some solutions attempt to reclaim heat in various ways.

Figure 7:
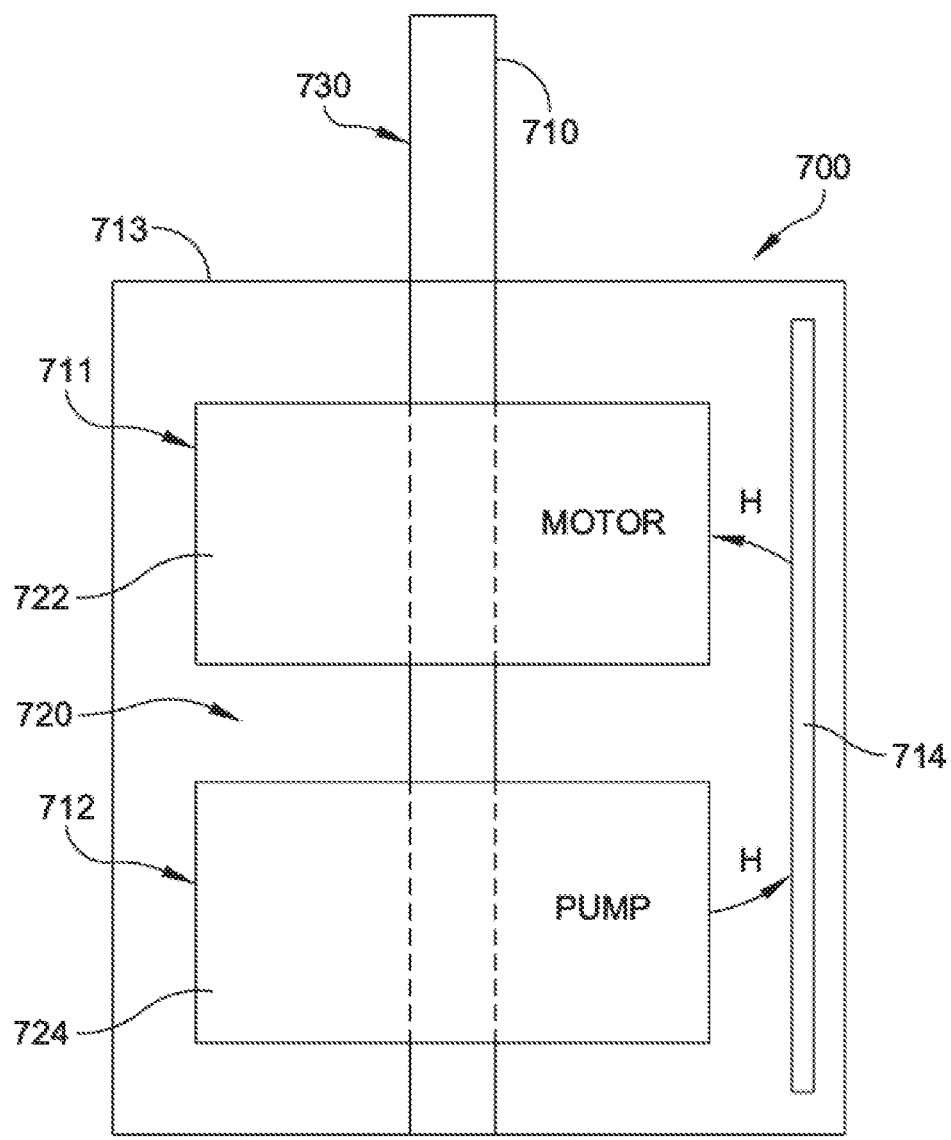
FIG. 7 is a block diagram of an example of a dual-acting pump and motor unit according to an embodiment.

FIG. 7 is a block diagram of an example of a dual-acting pump and motor unit 700 according to an embodiment. In an embodiment, the unit 700 may include more or fewer components than the components illustrated in FIG. 7. The components illustrated in FIG. 7 may be local to or remote from each other. Multiple components may be combined into one apparatus. Operations described with respect to one component may instead be performed by another component.

The unit 700 may use a $CO_2$-based power generation system as described herein. The unit 700 is configured to provide motive power or stored energy with a generator in a unit that is relatively straightforward and cost-effective to construct. Such a unit 700 may be useful in environmentally friendly (a.k.a. "green") applications, such as solar and geothermal power generation, as described in further detail below. The unit 700 may be sized effectively for use in domestic and light industrial applications. The unit 700 may be constructed from metal or another material. The unit 700 may contain bearings and associated bearing seals, a turbine and/or vanes, a shaft, a housing, and fluid/gas inlets and outlets. These components may be connected to inlet lines and outlet lines that route working fluid to a heat exchanger, to add heat to the fluid and exhaust heat from the fluid. The fluid expands when heated and then passes through the motor side, after passing through the motor where thermal energy is extracted. The working fluid is directed to the condenser, where it defines reduced volume as it is compressed, thus leaving residual power to perform work. The unit 700 may optionally include one or more additional components or features, including, but not limited to, extra chambers that compress the working fluid and perform cooling or heating. These chambers can also be connected to provide motive power and/or electricity production. In operation, the unit 700 acts by compressing and expanding in the same integrated device. The unit shares a common housing 713 for both its motor assembly 711 and its pump assembly 712. The housing 713 may also operate as an evaporator chamber, along a common shaft 710. The heating of the compression is offset by the cooling of the expansion within the shared space 720 of the evaporator housing/chamber 713.

In an embodiment, the dual-acting pump and motor unit 700 provides a compact pump/motor for thermal power, which increases efficiency and reliability and can be scaled appropriately for a variety of applications. One or more cooling tubes 714 may be included, to increase the efficiency of the working fluid in the pump and motor. Additionally, a refrigerant may be injected into the tubes, using the evaporation and condensing within a closed system. The pump 712 may be oriented at an angular tilt or vertically in a manner in which the working fluid's liquid phase resides on the pump side and the gas phase resides on the expansion side, thus increasing efficiency. The example illustrated in FIG. 7 is adapted to be compact for placement in a variety of devices and applications.

In general, in an embodiment, the unit 700 includes the pump 712 and motor 711 in the same housing 713. Within the housing, two or more chambers (pump chamber and motor chamber) may be offset to different sides, to allow improved working fluid piping/conduit options to the condenser and evaporator, without requiring lines or pipes to cross each other. This arrangement may implement an efficient Rankine-type cycle to transfer energy and/or harness power. Using a common shaft also makes the unit 700 lighter, more compact, and more durable than other options in which separate pump and motor mechanisms are joined by a transmission assembly (e.g. belts, gears, drive chains, etc.). The shaft 710 may be connected to a power generator, fan/impeller, and/or motive assembly.

The common shaft 710 may be configured to transfer work and power from one chamber to another (pump chamber and motor chamber) and allow for motive or electrical power to be created on that same shaft 710. The motor 711 is housed in an expansion chamber 722, where power is harnessed from the pump 712. The pump 712 is housed in a compression chamber 724, where the fluid is compressed to be brought to the evaporator. Chamber 113 is the housing that holds the working parts. The cooling tube assembly 714 is located between the two chambers 722 and 724, and may include any appropriate fluid (liquid or gas), to increase the efficiency of the pump by transferring heat from the pump to the motor chambers. The pump 712 and motor 711 may be offset to one side of the shaft 710, to provide an exposed power takeoff 730, as shown in FIG. 7, or may be on opposing sides of the shaft, with a power takeoff between them. The arrangement used may depend, for example, upon the locations of inlets and outlets as well as any interconnecting cooling tubes. In general, the internal construction of the pump 712 and the motor 711 may take many different geometric forms and theories of operation. For example, vane, gear, or turbine-based geometry may be used. In some examples, pumps that are adapted to operate in a hydraulic system may be adapted to operate with the power generation arrangement described herein.

Figure 7A:
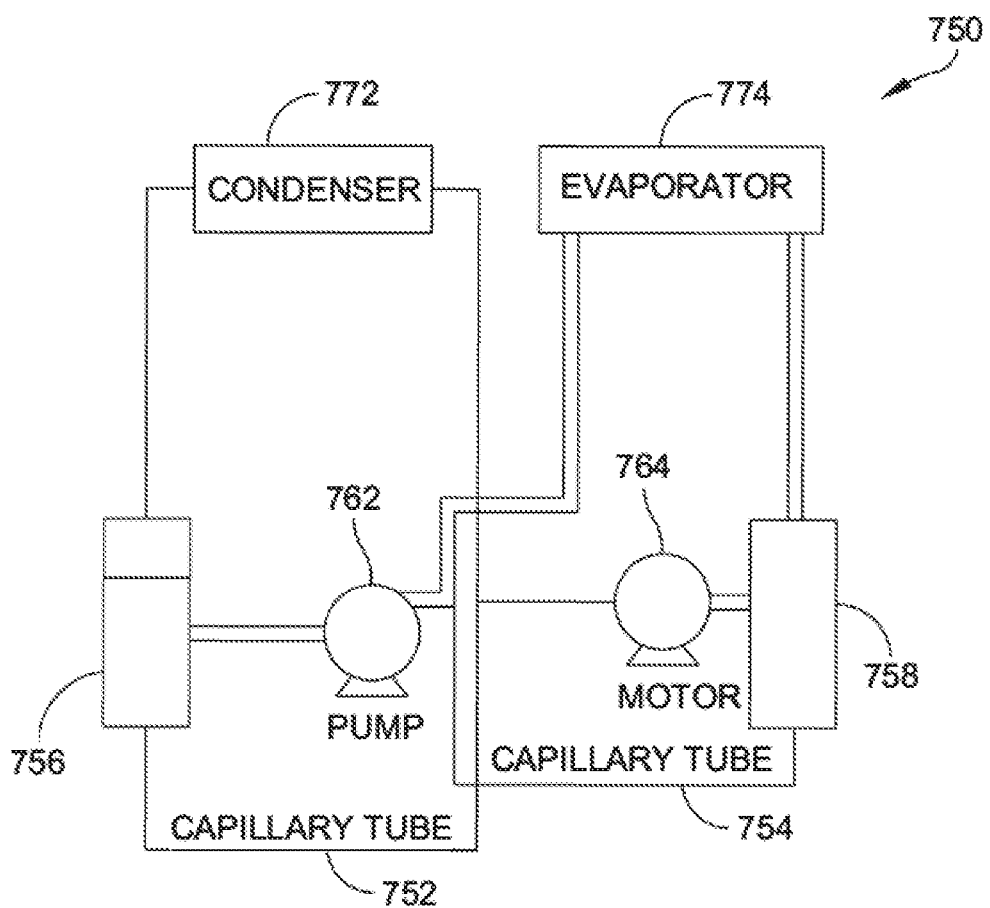
FIG. 7A is a block diagram of an example of a system according to an embodiment.

In operating a rotating pump and/or motor in a sealed environment with $CO_2$, it may be desirable to provide a mechanism for lubricating the pump and/or motor. FIG. 7A is a block diagram of an example of a system 750 according to an embodiment. Specifically, FIG. 7A illustrates a system 750 that may be used to lubricate a pump and/or motor operating in a $CO_2$-based power generation system as described herein (e.g., a $CO_2$-based environment that does not significantly degrade system/cycle performance). As illustrated in FIG. 7A, the system 750 is vertically arranged, as depicted, and thereby allows the lubricating fluid (e.g., various liquid petroleum-based, and/or silicone-based oils) to be collected in the reservoirs 756 and 758 and flow through small tubing 752 and 754, respectively, to oil the pump 762 and/or motor 764. This process does not allow the $CO_2$ to follow the same path, because liquid falls and gas rises inside the lubrication reservoir(s) 756, 758. In the example illustrated in FIG. 7A, each heat exchanger (e.g., condenser 772 and evaporator 774) is arranged at the top of its respective loop, thus assisting in separating the gas and liquid. The loop tubing used as a conduit for $CO_2$ may be larger in diameter, thereby providing increased flow capacity. The larger diameter may help prevent excessive $CO_2$ from travelling the shorter path to the adjacent motor or pump.

In some cases, pumps for moving lubrication fluid throughout the system 750 may be omitted. Alternatively, one or more pumps may be included to move lubrication fluid throughout the system 750. In the example illustrated in FIG. 7, in which the pump 712 and motor 711 are combined in a single enclosure, the pump 712 may be lower than the motor 711 and use a restrictor tube (e.g., a capillary tube) positioned low in the conduit at the exit side of the pump 712, so that fluid lubricant is driven to the entrance of the motor 711. Exiting the motor 711, gravity will return the fluid to the pump 712.

In an embodiment, the system 750 operates in a manner similar to a heat absorption refrigerator (in which water drops to the lower part of the system 750 while ammonia rises up to a higher level to change state). Here, a similar principle is used to provide lubrication to the pump 762 and/or motor 764. In addition, a lubricant other than a liquid lubricant may be used. For example, a solid particular lubricant may be used. Such lubricants may be provided as additives to a liquid-based system or as an alternative lubrication system. Solid lubricants may include, but are not limited to, nano-based molybdenum disulfide particles, graphite, graphene, C60 particles, polytetrafluoroethylene (PTFE), etc.

B. Low-Noise Portable Solar-Powered Thermodynamic Generator

Solar power generation is generally considered an environmentally friendly alternative to fossil fuels. However, solar power generation is generally inefficient in comparison to conventional fossil fuel-based power generation. In addition, solar power generation tends to have significantly higher costs on a per-Watt generated basis, and often requires large surface exposed areas to generate power (e.g., using photovoltaic (PV) cell arrays). However, generators (e.g., small portable generators) that run on fossil fuel are noisy and generate unwanted emissions, some of which can be highly toxic (e.g., carbon monoxide). Fossil fuel-based power generators are therefore poorly suited to certain applications and venues. One or more embodiments described herein provide a system and operational method for generating electricity from solar radiation (heat), which is also portable and relatively quiet during operation. The system is relatively low-cost, using readily-available materials and components, so as to reduce the cost-per-Watt over its operational lifetime. As one example, the system may be mounted at a convenient location near a structure and/or dwelling, to power the grid directly and/or charge either structure-connected battery assembly (e.g., battery assembly 817, described below). One or more such batteries may be part of a voltage/current inverter system (not shown) that provides, for example, 110 or 220 volts of alternating current (VAC) to the structure.

Figure 8:
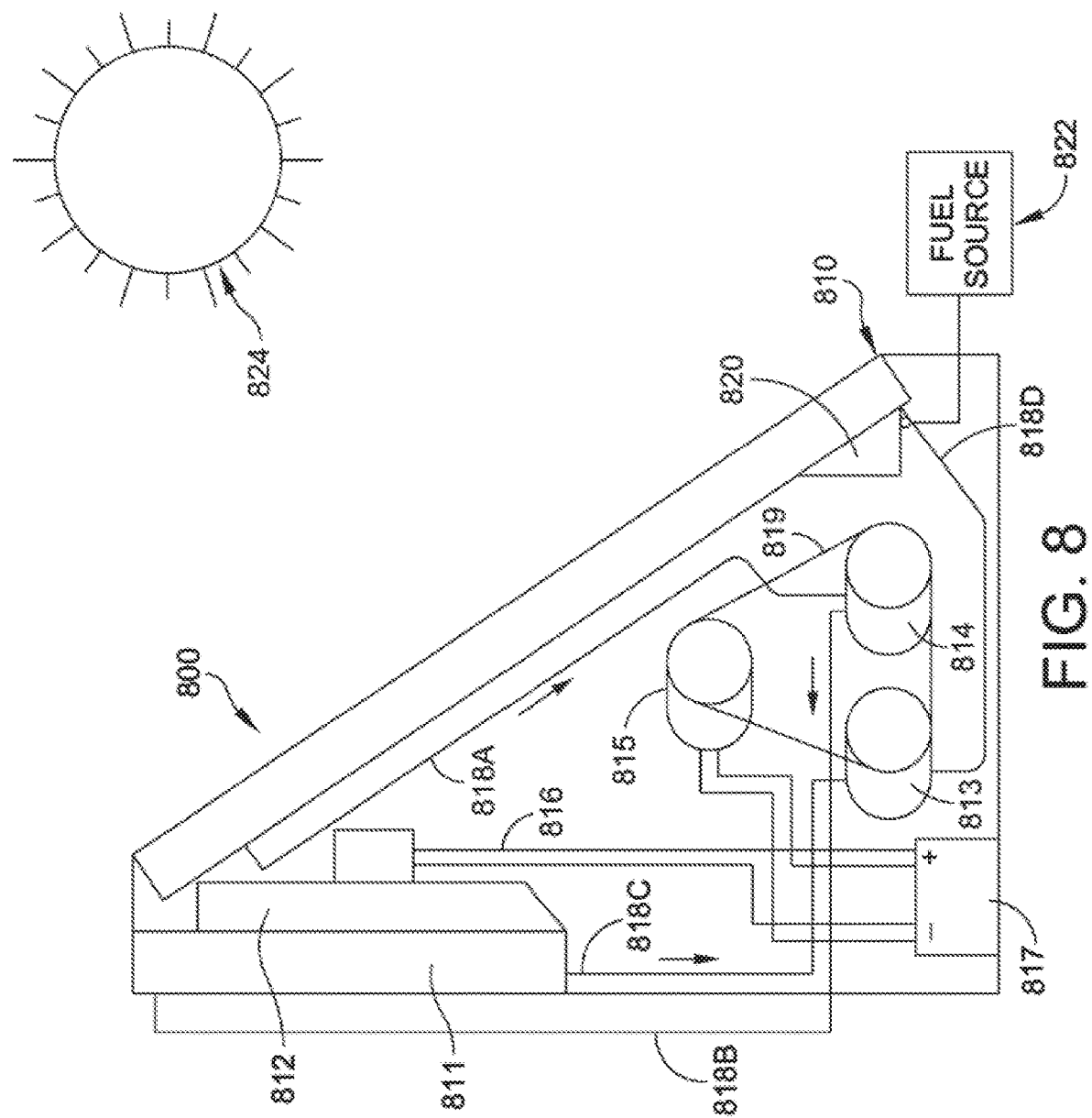
FIG. 8 is a block diagram of an example of a portable $CO_2$ thermodynamic electric generator system according to an embodiment.
Figure 9:
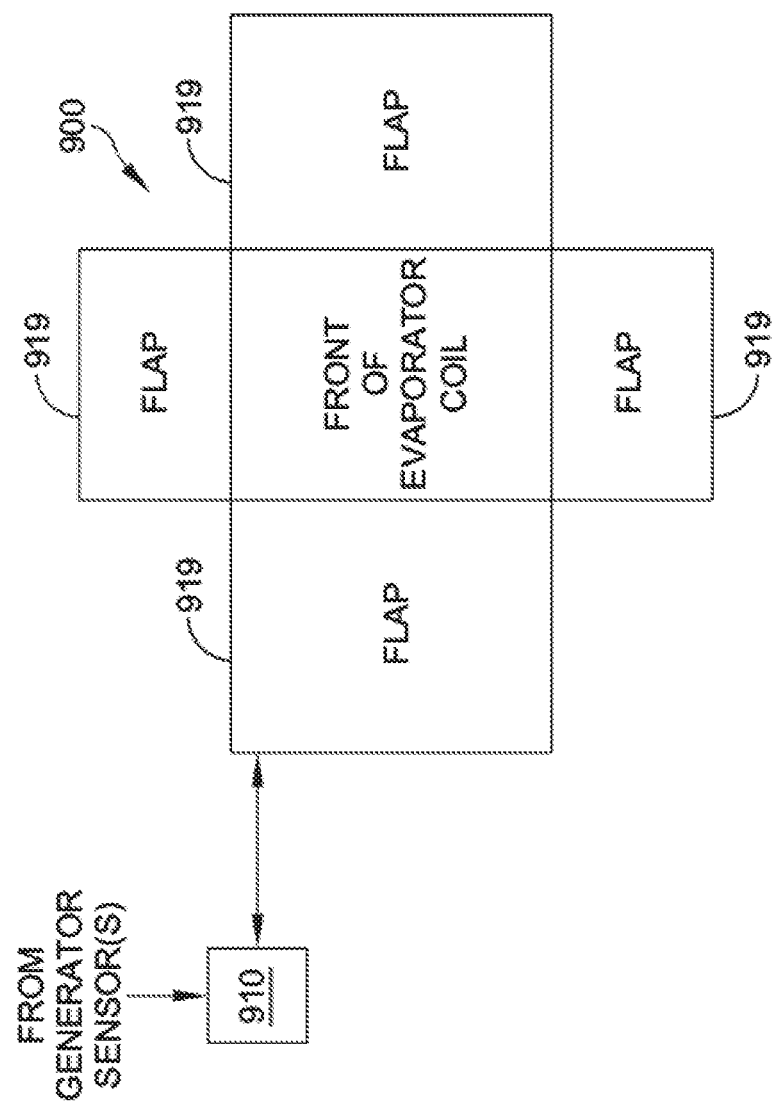
FIG. 9 is a block diagram of an example of a front view of the system of FIG. 8 according to an embodiment.

FIG. 8 is a block diagram of an example of a portable $CO_2$ thermodynamic electric generator system 800 according to an embodiment. Specifically, the system 800 is configured to provide evaporator heat to $CO_2$-based power generation. FIG. 9 is a block diagram of an example of a front view of the system 800 of FIG. 8. In an embodiment, the system 800 may include more or fewer components than the components illustrated in FIGS. 8 and 9. The components illustrated in FIGS. 8 and 9 may be local to or remote from each other. Multiple components may be combined into one apparatus. Operations described with respect to one component may instead be performed by another component.

In general, in an embodiment, the generator system 800 includes a pump 813, motor 814, condenser coil 811, evaporator 810, and electric generator 815. These components are operationally connected to harness the increased pressure of a fluid due to increased temperature. The working fluid (e.g., $CO_2$) is expanded in the evaporator 810, drives the motor 814, and is then condensed in the condenser 811. The fluid then passes through the pump 813 to be brought up to the pressure in the evaporator 810, and the cycle repeats. Additionally, the system 800 may include a Fresnel lens (described further detail below), a shade that controls how much solar heat (from sun 824) is applied to the evaporating coil 810, and/or a fan 812.

FIG. 9 illustrates an array of adjustable reflective flaps 919 that may enhance collection of solar radiation. As illustrated in FIG. 9, a shade includes a flap assembly 900. The flap assembly 900 includes multiple flaps 919 (four in this example) that can selectively fold out to direct more solar energy to the evaporator 810. The flaps 919 and/or shade may be motorized and communicatively coupled with a controller 910. The controller 910 is configured to monitor power output, temperature, and/or sun intensity (e.g., via sensors and/or a current/voltage meter) to control the operation of the system 800. In operation, one or more of the flaps 919 may be fully or partially opened/closed, to selectively shade to evaporator surface area. Additionally, one or more of the flaps 919 may have a reflective and/or specular inner surface that, at one or more particular angle(s), increases the degree of solar radiation incident upon the evaporator 810. Components of the flap assembly 900 may be controlled, at least in part, based on data from a sun tracking mechanism. One or more components of the system 800 (e.g., the entire unit and/or the evaporator 810) may be mounted on a gimbal system that is powered to allow tracking of the sun as it moves through the sky during the day.

Returning to discussion of FIG. 8, in an embodiment, the system 800 allows for relatively light weight, reasonably efficient power output and relatively low cost-per-Watt, in a package that generates electricity via solar thermal energy (rather than photovoltaics). The system 800 may use a Rankine-type cycle, such as that described above with reference to FIG. 6. The system 800 avoids the use of fossil fuels and/or the elevated/high temperatures commonly associated with fuel and/or steam (turbine) power generation. The temperatures at which the system 800 operates are relatively safe. In addition, the system 800 avoids dangerous open flames or combustion emission products for clean, reliable, renewable energy production during daylight hours. The system 800's combined use of solar heat and $CO_2$ working fluid may allow for superior power generation at normally encountered temperatures. Since $CO_2$ is a transcritical fluid at 87° F., there is a high pressure increase above 87 degrees, and a concomitant high level power creation within the expected 40° F. operating range temperature differential.

As noted above, the system 800 may be configured so that its components use a Rankine-type cycle to operate. As illustrated in FIG. 8, the condenser 811 may be positioned on the rear side of the unit, away from exposure to the sun's heat. The fan 812 draws relatively cool (e.g., ambient) air through the condenser coil 811, which may include tubes, fins, etc. The Rankine-type cycle includes the passage of fluid (e.g., transcritical $CO_2$) through the evaporator 810, where it is expanded and the pressure is increased by adding heat from the sun 824. The expanded fluid then travels via a conduit 818A, through the motor 814 so as to drive the mechanically connected (represented by a common belt or linkage 819) pump 813 and generator 815. Power produced by the generator 817 is routed by cables 816 to the battery 817 and fan 812. The fluid passes from the motor 814 via conduit 818B to the condenser 811, to be cooled and condensed. The fluid is then transferred via conduit 818C to the pump 813 to be brought up to pressure. The pressurized fluid then passes via conduit 818D back to the evaporator 810, and the cycle repeats itself. The motor 814 and pump 813 can be separate, discrete units as illustrated in FIG. 8. Alternatively, the motor 814 and pump 813 may be located integrally within the same/common housing (e.g., as described above with reference to FIG. 7). The system 800 may include wheels or casters, handles, etc. (not shown), to allow for ease of movement and increased portability. In addition, the power distribution circuit, which includes the battery 817 and cables 816, may include external outlets (e.g., 120 VAC and/or 240 VAC) (not shown), to accommodate power cords. These can be directed to plug-in tools, appliances, lights, etc., or to a changeover switch on a structure electrical service panel. The system 800 may further include a burn chamber or other external heat source to generate auxiliary heat at the evaporator, to ensure minimal or steady state operation as needed.

Figure 10:
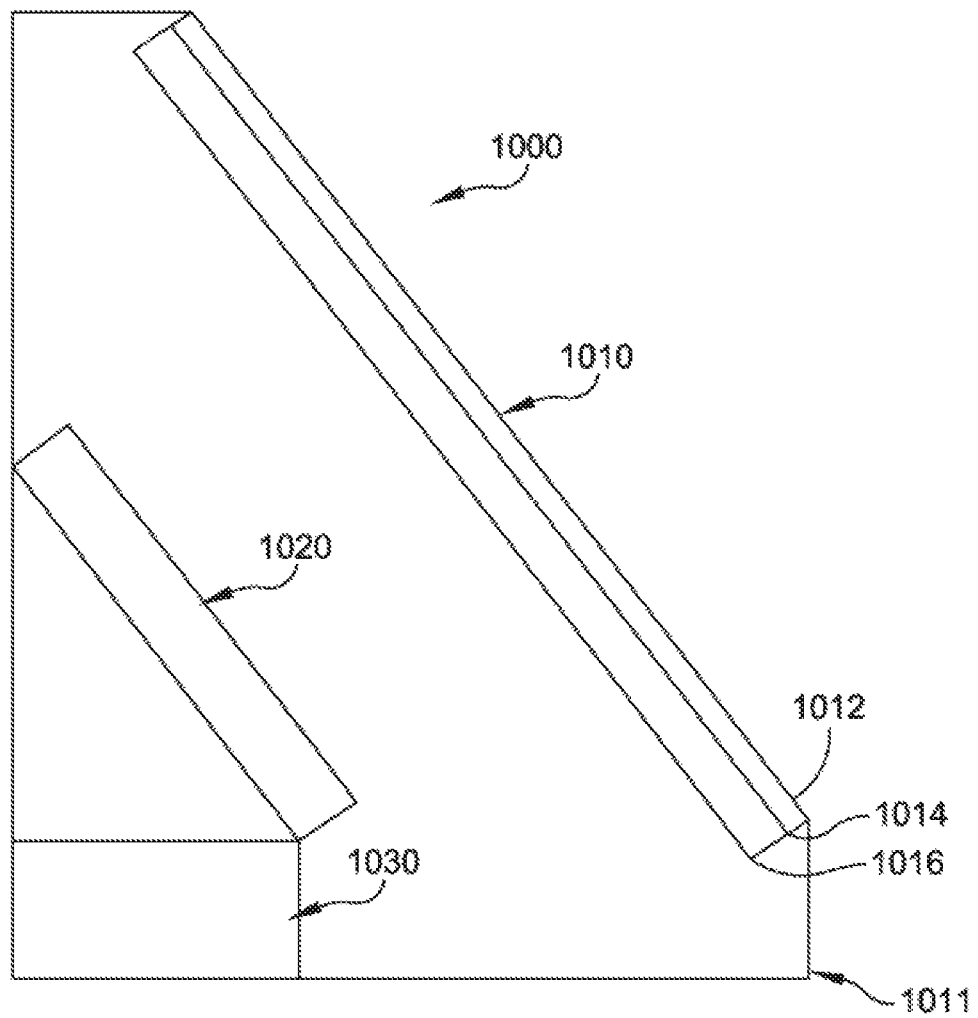
FIG. 10 is a block diagram of an example of a side view of a solar collecting unit according to an embodiment.

In an embodiment, the evaporating coil (evaporator) 810 is in thermal communication with an adjacent (optional) supplemental/auxiliary heating (or "burn") chamber 820. The burn chamber 820 may be fueled by a combustible fuel source 822 (for example, gasoline, fuel oil, kerosene, alcohol, propane, natural gas, wood pellets, fire wood, biomass, etc.). The fuel source 822 may reside directly in the chamber and/or unit housing, or may be remote as illustrated in FIG. 8 and connected by a feed line/mechanism. The burn chamber 820 may be sized and arranged to apply sufficient heat to allow the evaporator 810 to experience the needed temperature differential to operate a Rankine-type, transcritical $CO_2$-based thermodynamic cycle as described herein. In this manner, the burn chamber 820 may be configured to supplement the primary heat source (e.g., the sun 824), when the primary heat source is diminished or unavailable (e.g., on cloudy days or at night). The system 800 may thus provide a continuous power-generation resource, outputting at least a minimal level of power needed. Alternatively, an alternate heating source (e.g., a thermal battery that draws from stored heat, or an electric heating element that draws from stored electric power) may be used for such situations FIG. 10 is a block diagram of an example of a side view of a solar collecting unit 1000 according to an embodiment. The unit 1000 may be used in a $CO_2$-based power generation system, as described herein. In an embodiment, the unit 1000 may include more or fewer components than the components illustrated in FIG. 10. The components illustrated in FIG. 10 may be local to or remote from each other. Multiple components may be combined into one apparatus. Operations described with respect to one component may instead be performed by another component.

The unit 1000 may refer to a fixed-location or portable unit. The unit 1000 includes a front cover 1010 that is oriented to face the sun. The unit's front cover 1010 is angled (for example 30-45 degrees with respect to the vertical) as illustrated in FIG. 10, and includes multiple functional layers. The top layer 1012 is a clear or translucent glass or polymer (e.g., acrylic, polycarbonate, etc.) window that protects the interior. The top layer 1012 may include one or more weather seals configured to provide a seal with a surrounding frame that is supported by a housing 1011. The central layer 1014 is a movable shade or curtain constructed from a light-blocking material, such as polymer film/sheet, non-woven natural or synthetic fabric, or a woven natural or synthetic material. The inner layer 1016 may include, for example, a Fresnel or similar light-magnifying structure. A shade can be motorized or manually actuated. The shade is configured to slide up or down the window, to vary the amount of light striking the solar collector 1020 (which can be based upon or include a $CO_2$ evaporator, or a hot water coil to bring heat to an inside generator, as described above with respect to FIG. 8). Additional power generator components may be provided within the housing 1011, and/or remote therefrom and connected thereto (e.g., as described herein with reference to FIGS. 1 and 18). The unit 1000 may include an auxiliary combustion or heating chamber 1030 that uses a combustible fuel (e.g., wood, gasoline, propane, etc.) and/or an electric heating element (powered, for example, by batteries). Heat from the chamber 1030 is routed to the evaporator 1020.

C. On-Board Solar Electric Car/Vehicle (EV) Charging System

While various commercially-available systems for charging electric vehicles (EV's) (e.g., cars, trucks, etc.) exist, charging can be a slow process. Faster charging is preferable, especially where the vehicle's charge capacity (and corresponding mileage) is limited and/or dwell time at a charging location is limited (for example, at a workplace or shopping center). Charging vehicles at home, or another long-term parking spot, allows for longer charge times, but entails the cost of domestic power on the part of the user/owner. A charging system described herein provides a charging system for an EV that reduces or eliminates downtime and latency in performing the charge process and generally reduces the overall cost of charging EV batteries. The charging system may allow for runtime charging of the vehicle, while in motion (thus eliminating downtime). The charging system may use solar-based charging techniques described in further detail below.

Figure 11:
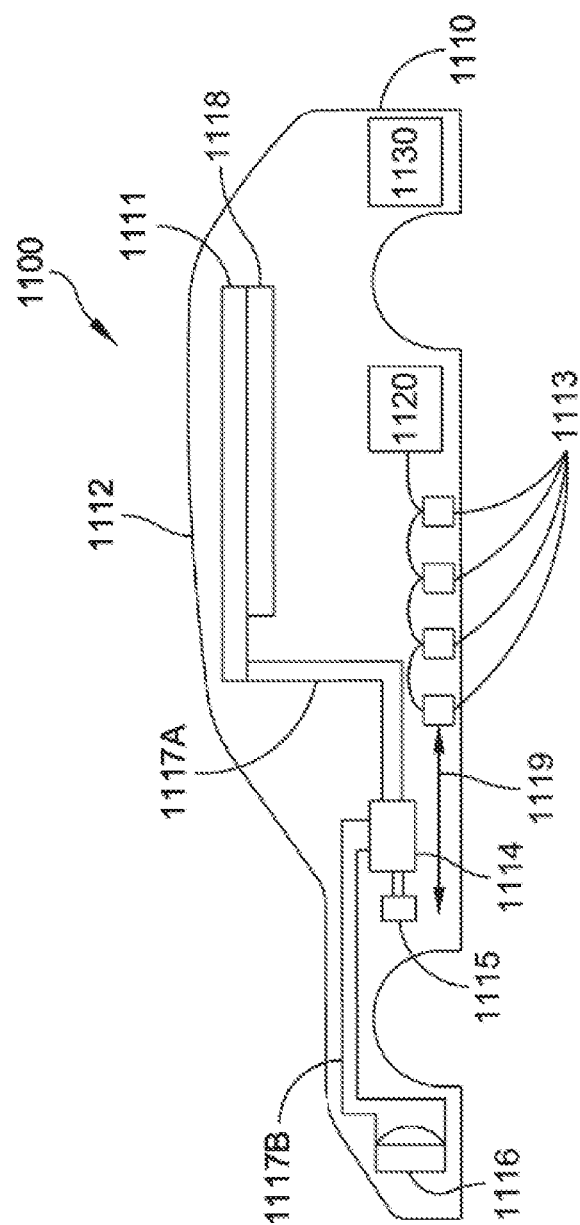
FIG. 11 is a block diagram of an example of an electric vehicle (EV) according to an embodiment.

FIG. 11 is a block diagram of an example of an electric vehicle (EV) 1100 according to an embodiment. In an embodiment, the EV 1100 may include more or fewer components than the components illustrated in FIG. 11. The components illustrated in FIG. 11 may be local to or remote from each other. Multiple components may be combined into one apparatus. Operations described with respect to one component may instead be performed by another component.

The EV 1100 may use a solar-based charging system that, in turn, uses a $CO_2$-based power generation system as described herein. Specifically, the EV 1100 may use a power generation system for charging batteries in accordance with a $CO_2$-based Rankine-type cycle as described herein (e.g., as described above with reference to FIG. 6). The cycle may be modified for extreme cold weather conditions encountered in many regions. For example, the cycle may operate below 20° F., provided that approximately 20 degrees of temperature differential between the evaporator side and condenser side of the fluid circuit can be maintained. More generally, the depicted cycle may be capable of operating in almost at any earth-based temperature condition, so long as a desired temperature differential is available.

As illustrated in FIG. 11, the EV 1100 includes a body shell 1110, which may include standard features and controls. The shell 1110 defines a roof overlying the vehicle cockpit, having a transparent or translucent (e.g., glass, acrylic, polycarbonate, etc.) roof panel 1112 that allows for transmission of light into a relatively thin evaporator 1111. The evaporator 1111 may be configured to function in a manner described above with reference to FIGS. 8-10. The evaporator 1111 is linked via high-pressure conduits or hoses 1117A to a combination motor and pump assembly 1114 (e.g., as described above with reference to FIG. 7). The pump/motor assembly 1114 drives a generator 1115. The generator 1115 may be part of a power distribution and balancing circuit 1120 that interconnects batteries 1113 via a cable assembly 1119. The pump/motor assembly 1114 is also connected via high pressure conduits 1117B to a condenser 1116. As illustrated in FIG. 11, the condenser 1116 is located at the front of the EV 1100 and may include a fan and/or other airflow-inducing components (e.g., a grille, side louvers, etc.). Alternatively, the condenser 1116 (or multiple condensers joined in series or parallel) and/or evaporator(s) 1111 may be located at one or more positions on the body shell 1110, so as to efficiently exhaust and absorb heat. For example, a low placed condenser may be less desirable where pavement is hot. Vanes and/or deflectors may be used to avoid ground-sources airflow. A higher positioning for the condenser 1116 may be helpful so that while driving in hotter conditions (e.g., during the summer), the condenser 1116 is situated farther away from hot air rising off the pavement and closer to the cooler air higher off the ground. In general, one or more evaporators 1111 may be placed to receive heat from the surface of the road in addition to sunlight, while one or more condensers 1116 may be placed to receive cooler air flow. In general, the pump/motor assembly 1114 and generator 1115 may be placed anywhere within the shell 1110 that is convenient and assists with weight and balance, as well as efficient use of interior space.

A $CO_2$ fluid circuit used in the EV 1100 may include powered and computer-controlled valves that open or close the flow to particular condensers 1116 and/or evaporators 1111 in different modes (e.g., different ambient weather conditions and/or while in motion, where ram-air can cool the condenser), to improve power output from the generator 1115 and associated pump/motor assembly 1114. A sensor array 1130 may be located at one or more positions on and/or within the EV 1100 and within its control system. The array 1130 is configured to read parameters such as vehicle speed, road temperature, ambient air temperature, power output, fluid temperature and pressure at various locations within the fluid circuit (e.g., each evaporator 1111, condenser 1116, pump/motor assembly 1114, etc.), and/or another parameter or combination thereof. The array 1130 uses the parameters to selectively determine flow through each of the condenser (s) 1116 and evaporator(s) 1111, with flow to/from various components being activated or deactivated depending upon a set of programmatic rules configured to optimize power output based on the values of the parameters. The approach may help achieve an optimal or near-optimal temperature difference in variety of conditions, including but not limited to cloudy or sunny days, hot or cold ambient temperatures, and whether the EV 1100 is parked or in motion.

In an embodiment, a burn chamber 1118 or heating element located adjacent to the evaporator 1111 is configured to provide additional heat to the fluid in the evaporator 1111, to start, run, or stabilize the thermodynamic cycle. The chamber 1118 may be powered/heated by stored electricity (battery power) or a fuel source, such as gasoline, natural gas, propane, etc. Additionally, one or more evaporators 1111 may be integrated with body panels (e.g., within the car hood, trunk lid, etc.). Any of these panels, including the roof, may be implemented as transparent shells with an underlying evaporator 1111. Alternatively, a panel may be implemented as a light/heat absorbing structure (i.e., the panel itself may be part of the evaporator 1111) having, for example, a semi-opaque or fully opaque, radiation-absorbing finish. A light-transmitting panel may include one or more focusing structures, such as a Fresnel lens. One or more evaporators 1111 may be located internally and receive hot air via a grille or other air-directing structure. As illustrated in FIG. 11, the pump and motor may be an integral assembly 1114 within a common housing and shaft. Alternatively, the pump and motor may be separate components joined by a mechanical linkage. The generator 1115 may also be provided on a common shaft or via a linkage. Gearing may be used to increase or reduce relative rotational speed/torque for any of the rotating components.

As described above, in operation, the fluid is expanded and pressure increased in the evaporator(s) 1111 based upon applied heat from the sun, hot pavement air convection, etc. The expanded fluid passes to the motor chamber of the pump/motor assembly 1114 from which power is produced. The de-energized fluid then passes to the condenser(s) 1116 to lose heat and pressure. The fluid then passes to the pump chamber of the pump/motor assembly 1114, to be brought up to the pressure of the evaporator 1111, and the cycle repeats.

D. Low-Noise Power Generation and Charging System for Boat, RV and/or Other Mobile Living Space Many vehicular and mobile living space applications (e.g., boats, recreational vehicles (RVs), temporary dwellings, trailers, etc.) use supplementary or fully off-grid electric power. In some instances, such as boats at sea or RVs in the wilderness, remote power generation is the only option for sustained electricity, because power hookups to the grid are unavailable. This need is often served by running the vehicle's engine or powering a separate, auxiliary power unit, such as a gasoline or diesel generator that is mounted within the vehicle and used to charge storage batteries that are drained while the engine/generator is powered off. Such engines/generators are often noisy, consume fuel at a high rate, and produce noxious and potentially hazardous/lethal exhaust fumes. Such engines/generators may therefore be poorly suited for operation, for example, when the vehicle is stationary or running without engine (e.g., under sail). While photovoltaic devices are sometimes used to provide auxiliary power and charge storage batteries, these produce minimal power within a given surface area. Small-scale windmills may be used, but wind is unpredictable and such windmills take up significant space (for example, often requiring an elevating mast to fully catch the prevailing winds aloft). Without sufficient power availability, the vehicle (e.g., boat) may lack sufficient motive power and/or may be unable to power auxiliary systems such as lights, cooking appliances, etc.

Figure 12:
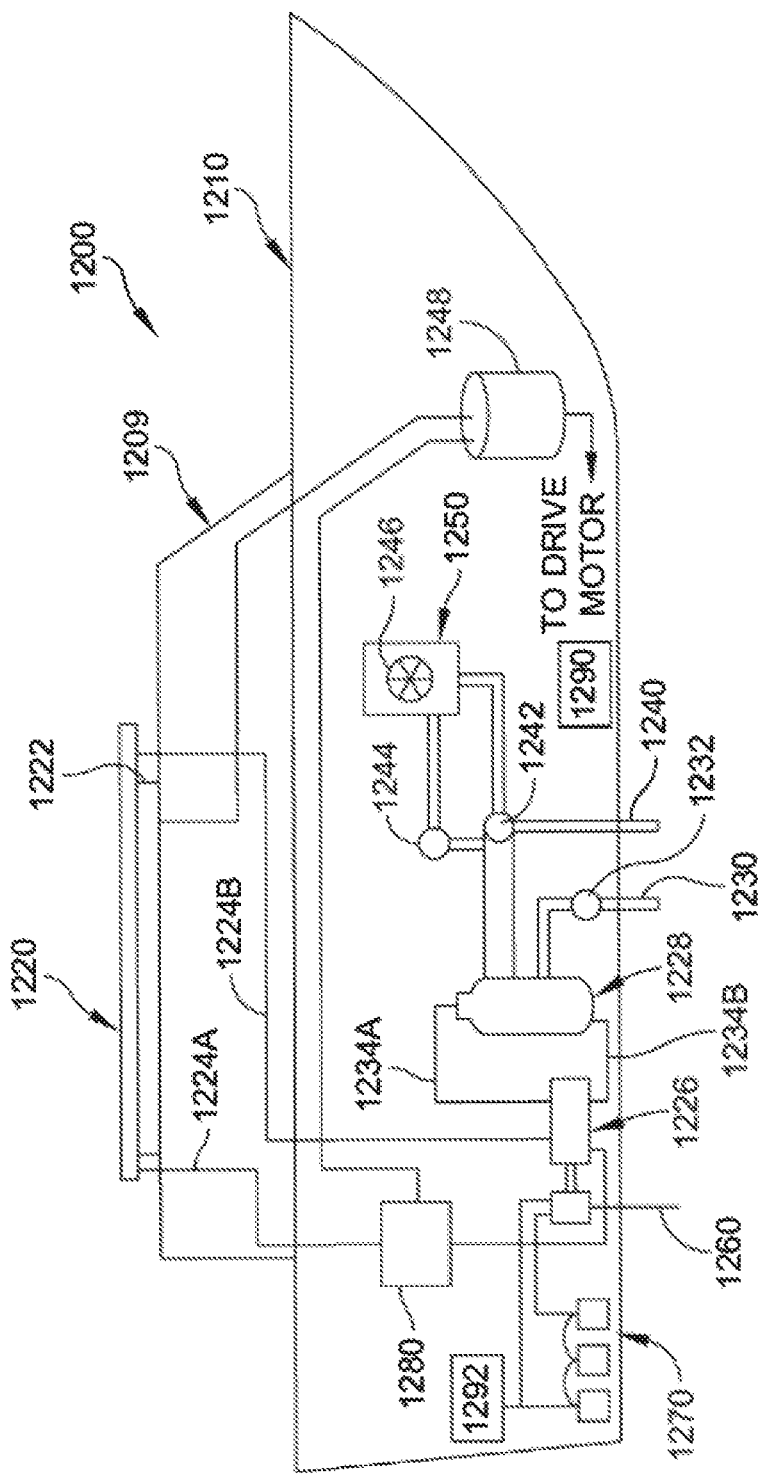
FIG. 12 is a block diagram of an example of a vehicle with an interior living space according to an embodiment.

FIG. 12 is a block diagram of an example of a vehicle 1200 with an interior living space according to an embodiment. In an embodiment, the vehicle 1200 may include more or fewer components than the components illustrated in FIG. 12. The components illustrated in FIG. 12 may be local to or remote from each other. Multiple components may be combined into one apparatus. Operations described with respect to one component may instead be performed by another component.

In the example illustrated in FIG. 12, the vehicle 1200 is a boat. However, approaches described herein may similarly be applied to other types of vehicles with interior living spaces (e.g., RV's, temporary dwellings, trailers, etc.). In general, FIG. 12 illustrates a vehicle configures to use a solar-based charging and power system which can also provide interior heating, using a $CO_2$-based power generation system as described herein.

As illustrated in FIG. 12, the vehicle 1200 has a hull or body shell 1210 and associated superstructure 1209. The hull/shell 1210 and superstructure 1209 house the components of a Rankine-type cycle $CO_2$-based power generation and battery charging system. This system may include components that are similar in structure and operation to the EV system described above with reference to FIG. 11, which may be adapted to the scale and layout of a vehicle with living space. The vehicle 1200 may include a conventional fuel source (e.g., a fossil fuel source), and optionally, an internal combustion engine that runs on such conventional fuel. One or more evaporator assemblies 1220 is/are located so as to receive incident solar radiation. The evaporator 1220 may be horizontally fixed as shown, or may be arranged in a compound angle to conform to various surfaces of the deck/roof of the vehicle 1200. The evaporator assembly 1220 may also be arranged on a movable mount that tilts variably to track the sun, using known tracking systems and methods.

A combustion/burn chamber 1222 that consumes fuel (e.g., fossil fuel) may be located adjacent to the evaporator assembly 1220. The burn chamber 1222 may operate when insufficient solar energy is present (for example, on a cloudy day or at night), to provide a continuous and/or stable heat level to the evaporator 1220. Environmental and system sensors and controls 1290, which may be similar in structure and function to those described above with reference to FIG. 11, may be provided to regulate burn rate and operation of the system thermodynamic cycle. Conduits 1224A and 1224B route fluid to and from the evaporator 1220, respectively. Conduit 1224B is interconnected with a combined pump/motor assembly 1226. The assembly 1226 is also connected to a heat exchanger 1228, which functions as a condenser via conduits 1234A and 1234B, in this example drawing water from the surrounding environment via an inlet pipe 1230 and associated water pump 1232. Heated water is exhausted from the heat exchanger 1228 back into the environment via an outlet pipe 1240. Powered or manual valves 1242 and 1244 may be configured to redirect part of the water flow from the outlet 1240 to a radiator within a fan assembly 1246. The fan assembly 1246 may be used to heat the interior of the hull/shell 1210. Alternatively or additionally, the heat from the exchanger 1228 may be used to heat water (e.g., to provide domestic hot water). Fan speed and/or valves 1242 and 1244 may be controlled using a thermostat circuit with user-provided settings (e.g., a temperature setpoint). The fan assembly 1246 may optionally include a burn chamber 1250, which may be powered by fuel source 1248 (e.g., fossil fuel) and used to provide heat to an evaporator located within the hull/shell. The source 1248 may be the same or different from that used to drive a primary drive motor for the vehicle 1200.

As illustrated in FIG. 12, the pump/motor assembly 1226 is mechanically interconnected to a generator 1260. This generator 1260 charges batteries 1270 under the control of control circuit 1292. The conduit 1224A to the evaporator assembly 1220 can include an optional inline heater 1280 that consumes electricity or the fuel from source 1248 to heat the fluid before it enters the evaporator. This heater 1280 and other components may be operated variably based upon the sensor and control array 1290. This array 1290 may be configured to measure, for example, fluid temperatures and power inputs/outputs at various components. The array 1290 may be configured to adjust flow rate, burn, and heat exchange (e.g., water pump speed) to regulate power generation based upon demand. The primary drive motor for the vehicle 1200 may be powered by fossil fuel. Alternatively, the primary drive motor may be electric and draw from the batteries and charging system. The use of one or more burn chambers (e.g., burn chamber 1250) helps ensure that the thermodynamic system can provide needed power even during peak demand.

In the example of FIG. 12, operation of the fluid cycle is similar to that described above, with pressurized fluid passing from the evaporator assembly 1220 to the motor chamber of the pump/motor 1226, and then to the heat exchanger 1228, pump chamber, and back to the evaporator assembly 1220. In some cases, the heat exchanger 1228 may be substituted with an air-cooled condenser or with a water-cooled heat exchanger that draws from standing water (e.g., a well, lake, ocean, etc.).

A system as illustrated in FIG. 12 may be capable of running quietly, even when auxiliary fuel combustion is required, as it is free of internal combustion engine noise or exhaust. The system efficiently uses waste heat from a water-cooled heat exchanger or air-cooled condenser to selectively heat the interior living space of the vehicle 1200. As $CO_2$ can operate within very small temperature differentials while providing high pressure differentials, the use of turbines or vane motors can harness the expansion and contraction of the fluid in a manner that is relatively quiet, and employs a sealed system. Since waste heat is recycled and the primary heat source is the sun, the system may operate very efficiently.

E. Geothermal Heat Loop and $CO_2$-Based Generator

Geothermal energy (e.g., implemented as a ground-source heat pump) is an increasingly popular technique for providing domestic heating and cooling to homes and other structures. Such systems rely upon the stability of subsurface temperatures during both winter and summer months. That is, while surface temperatures can vary by 100 degrees or more, generally temperatures several feet below the ground remain a relatively constant 50-60° F. (in most temperate climates) throughout the year. Deeper water aquifer temperatures may be even more constant. The stability of such temperatures, combined with the expansiveness of the subsurface earth and ground water, make them an ideal environment from which to draw or deposit heat in order to, respectively, heat or cool a surface region. Given the relatively low required temperature differential to operate the above-described Rankine-type $CO_2$-based cycle (e.g., as described with reference to FIG. 6), the heat differential present in a geothermal environment (versus surface temperature) renders it a strong candidate for use in power generation using that cycle.

Figure 13:
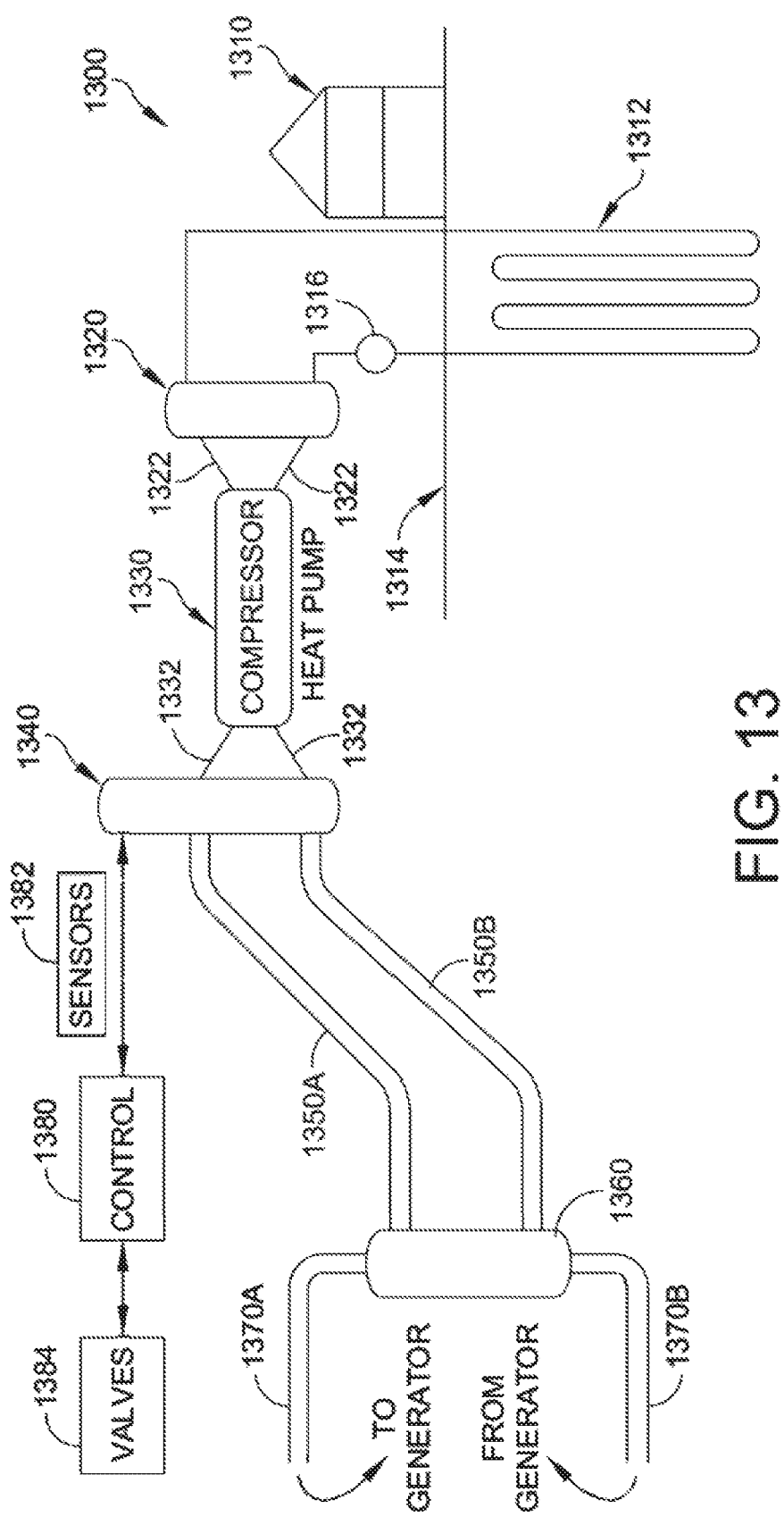
FIG. 13 is a block diagram of an example of a geothermal heating and cooling system according to an embodiment.

FIG. 13 is a block diagram of an example of a geothermal heating and cooling system 1300 according to an embodiment. Specifically, FIG. 13 illustrates a geothermal heating and cooling system 1300 for a structure 1310 that interfaces with the $CO_2$-based power generation system as described herein, to increase overall efficiency and provide electric power to the structure 1310. In an embodiment, the system 1300 may include more or fewer components than the components illustrated in FIG. 13. The components illustrated in FIG. 13 may be local to or remote from each other. Multiple components may be combined into one apparatus. Operations described with respect to one component may instead be performed by another component.

As illustrated in FIG. 13, a geothermal loop is used as a heat sink for cooling in warm months or to extract heat to warm the structure 1310 in cold months. The geothermal loop includes conduits or tubes 1312 that extend into and out of the ground 1314, for example in relatively shallow earth (below the frost line) or into a deep well/aquifer. The loop tubes 1312 may be filled with water, a glycol mix, or another compound that facilitates heat transfer between the ground 1314 and the fluid. A circulator pump 1316 causes the fluid in the loop to flow in a predetermined direction that passes through a heat exchanger 1320. This exchanger 1320 may be located in the structure 1310 or another housing.

The heat exchanger 1320 interacts with refrigerant or another compressible fluid that is routed through conduits 1322 to a compressor 1330 that is part of the heat pump system. Another heat exchanger 1340 receives fluid passed through the compressor 1330 via conduits 1332. This heat exchanger 1340 interacts with a fluid such as water and/or glycol, with a pump to bring heat from the geothermal system to the generator system. The fluid is passed to and from the heat exchanger 1340. Lines 1350A and 1350B interact with another heat exchanger 1360, which is part of a $CO_2$-based power generation system as described above (e.g., with reference to FIG. 12). Lines 1370A and 1370B carry $CO_2$ to and from the generator mechanism (not shown). Flow through the lines 1370A and 1370B may be controlled via a control system 1380, which reads various sensors 1382 for pressure and temperature (e.g., on components, ambient air, ground, geothermal loop, etc.), and thereby operates valves 1384. The valves 1384 allow the system 1300 to cool the generator on the condensing side during colder months and heat the evaporator so as to heat the $CO_2$ during warmer months. The controller 1380 attempts to balance flows and rates of operation to optimize efficiency.

VII. Additional Solar Heat Collection Arrangements

A. Solar Collector with Vented Chamber for Continuous Airflow

Figure 15:
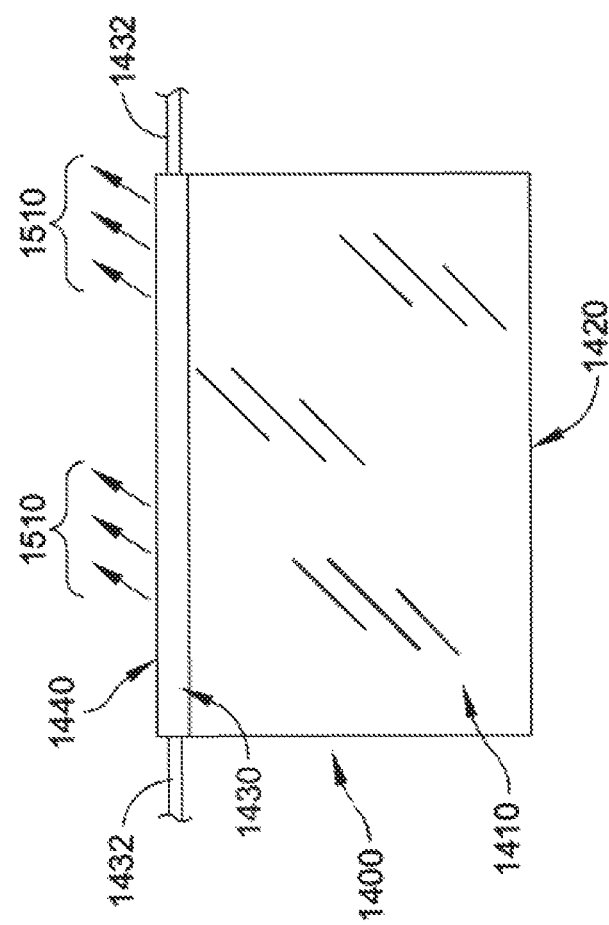
FIG. 15 is a block diagram of an example of a front view of the vented solar collector of FIG. 14, according to an embodiment.
Figure 14:
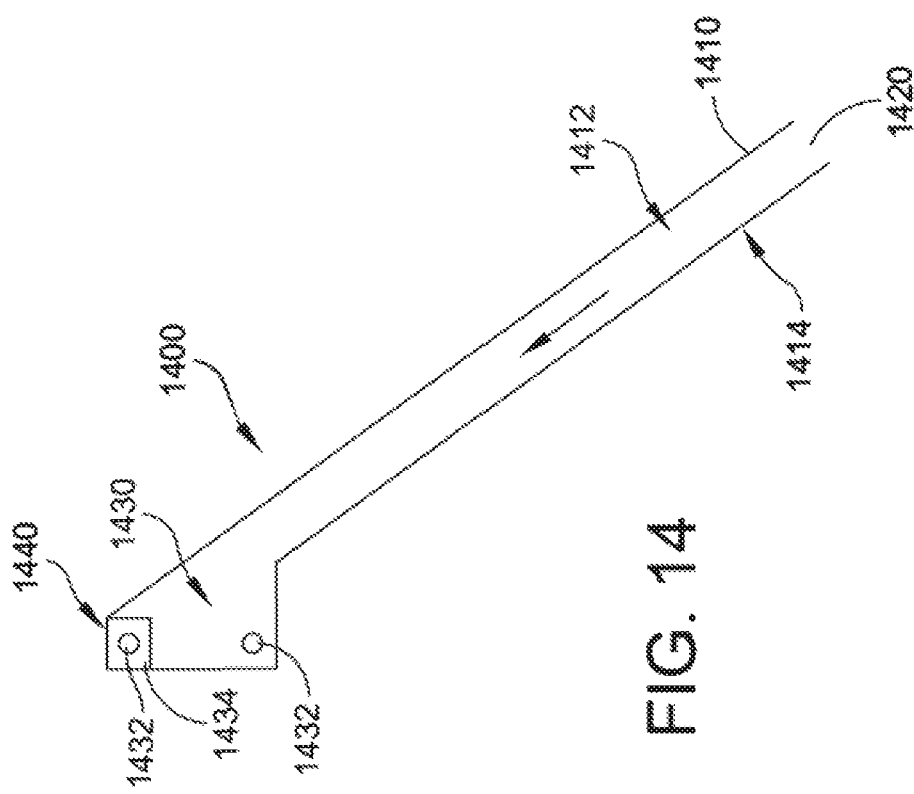
FIG. 14 is a block diagram of a side view of a vented solar collector according to an embodiment.

FIG. 14 is a block diagram of a side view of a vented solar collector 1400 according to an embodiment. The vented solar collector 1400 is configured to provide heated working fluid (e.g., water) for domestic use and/or the evaporator of a $CO_2$-based power generation system as described herein. FIG. 15 is a block diagram of an example of a front view of the vented solar collector of FIG. 14, according to an embodiment. In an embodiment, the collector 1400 may include more or fewer components than the components illustrated in FIGS. 14 and 15. The components illustrated in FIGS. 14 and 15 may be local to or remote from each other. Multiple components may be combined into one apparatus. Operations described with respect to one component may instead be performed by another component.

The collector 1400 may be used in a variety of applications described herein. The collector 1400 includes a transparent or translucent cover 1410 that allows the passage of solar radiation, while containing the heat within a chamber 1412. The rear wall/panel 1414 of the chamber 1412 can be constructed with an opaque or otherwise heat-absorbing material (e.g., metal) and/or coating (e.g., black stove paint). Any heat-conductive material that can withstand solar heating without permanent deformation or melting may be used. The bottom end 1420 of the collector 1400 is open between panels 1410 and 1414, so as to allow ambient air to pass into the chamber 1412. The bottom end 1420 may include louvers, grating, etc., to avoid infiltration of foreign matter. A heat collection space/chamber 1430 is disposed at the opposing top end of the collector 1400. This space 1430 may include one or more conduits that transfer(s) heat passing up the chamber 1412. For example, the space 1430 may include copper tube 1432, which may be finned 1434. The top end includes an upper vent 1440 through which rising, heated air passes out of the collector 1400 (for example, as illustrated by the arrows 1510 in FIG. 15), after heat has been transferred to the tubing 1432. The tubing 1432 may be routed to an evaporator or other heat-driven device (for example, hydronic heating). A circulator pump with a controllable flow rate (for example based upon heat transfer rate) may be provided to circulate fluid through the tubing 1432. The space 1430 may further include a burn chamber that combusts fuel (for example, fuel oil, propane, natural gas, wood, or wood pellets) to enhance heating of the tubes 1432 when insufficient solar heat is available. Alternatively, the flow of air from bottom to top of the chamber 1412 may be omitted and the collector 1400 may be sealed. This sealed configuration may result in significantly higher generated heat transferred to the fluid, as described above.

B. Adjustable Solar Heat Collector for Thermal Electric Generator

While a variety of solar heat collectors are presently available on the market, they generally do not allow for adjustments to regulate heat flow into a working fluid. One or more systems described above allow for such adjustments. One or more systems described below also allow for such adjustments. Such a system may be used to generate heat for $CO_2$-based power generation as described above, or for other applications (e.g., domestic hot water heating and/or hydronic heating). Specifically, the system operates in a manner such that the flow rate of the fluid is adjustable, allowing the fluid to achieve the desired temperature with available solar heat.

Figure 16:
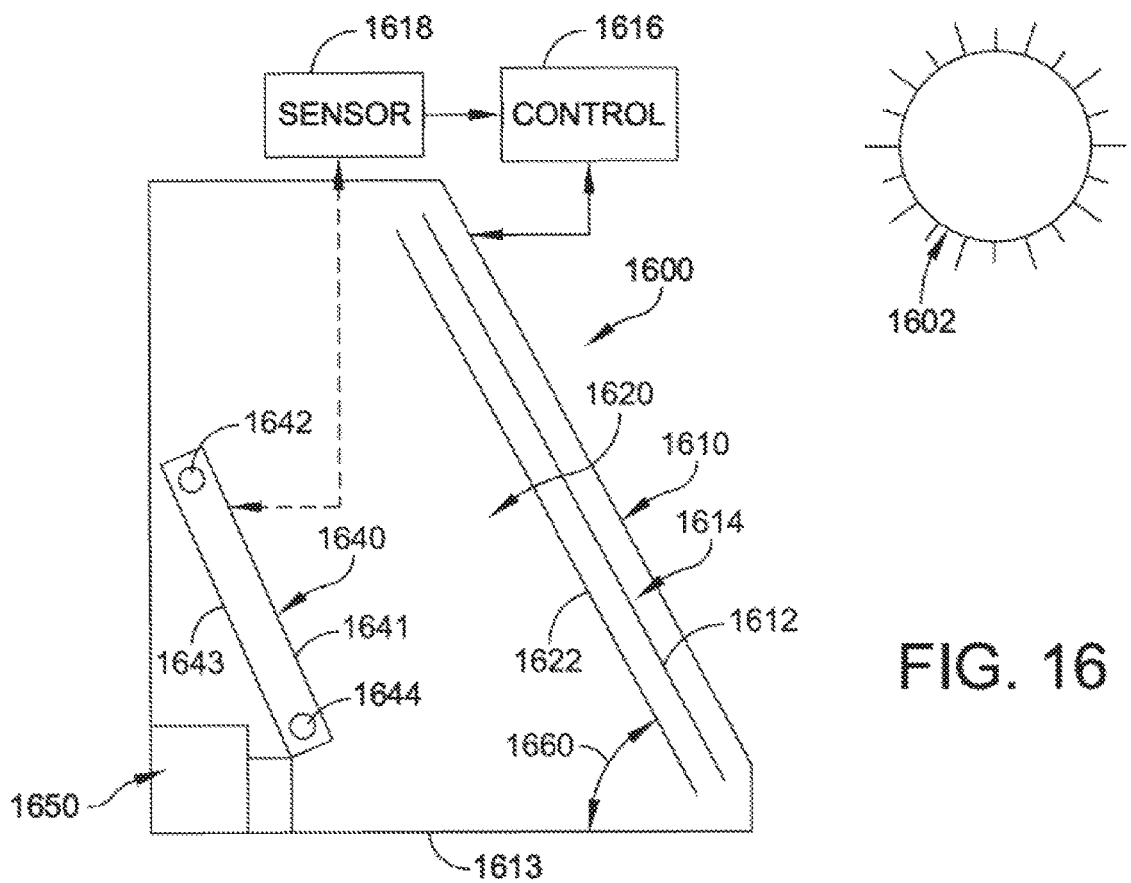
FIG. 16 is a block diagram of an example of a solar collector system according to an embodiment.
Figure 17:
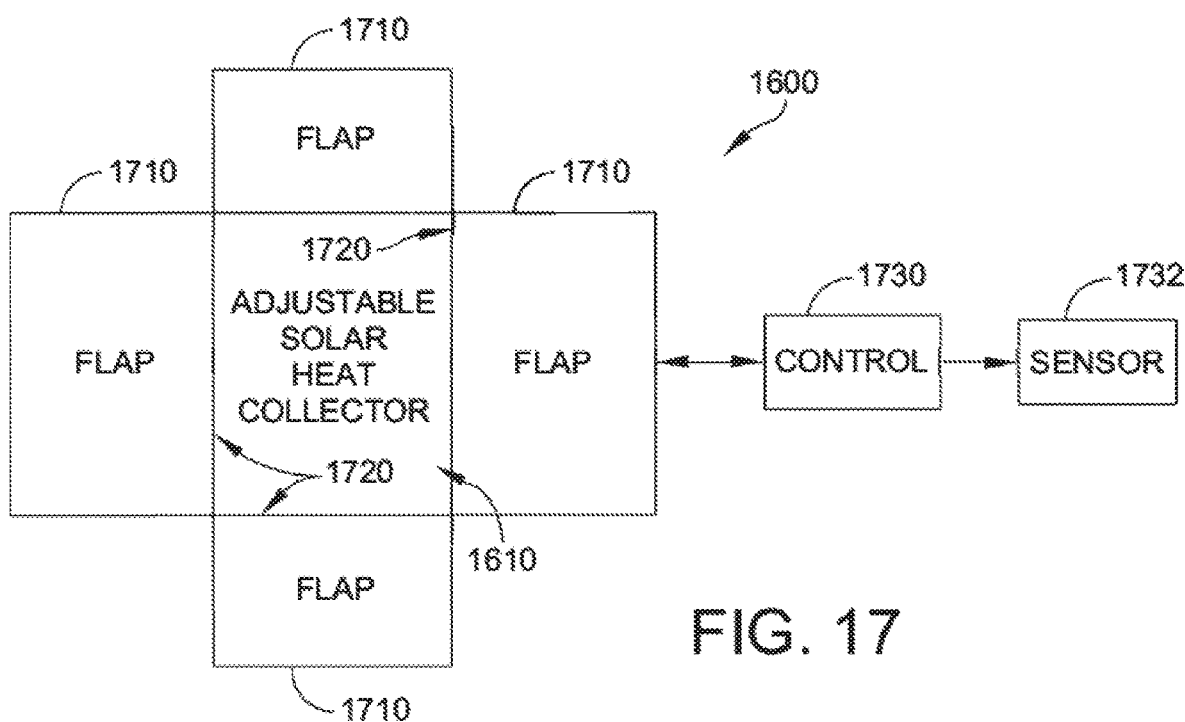
FIG. 17 is a block diagram of an example of a front view of the solar collector system of FIG. 16 according to an embodiment.

FIG. 16 is a block diagram of an example of a solar collector system 1600 according to an embodiment. The system 1600 includes an adjustable shade assembly and/or reflecting flap assembly to variably heat fluid (e.g., water) for domestic use and/or the evaporator of a $CO_2$-based power generation system as described herein. FIG. 17 is a block diagram of an example of a front view of the solar collector system of FIG. 16 according to an embodiment, including an array of adjustable reflective flaps for enhancing collection of solar radiation. In an embodiment, the system 1600 may include more or fewer components than the components illustrated in FIGS. 16 and 17. The components illustrated in FIGS. 16 and 17 may be local to or remote from each other. Multiple components may be combined into one apparatus. Operations described with respect to one component may instead be performed by another component.

As illustrated in FIG. 16, the system 1600 includes a front panel 1610 having a transparent or translucent panel (e.g., glass, polymer, etc.) that is arranged to face or track the sun 1602 in an effort to increase exposure to incident solar radiation. The front panel 1610 is oriented at an angle 1660 with respect to the ground/horizontal 1613. The angle 1660 may be variable, depending upon placement and the prevailing path of the sun 1602. The panel 1610 may be oriented to track the sun 1602 or change the angle 1660. The panel 1610 is part of a housing or cabinet that defines an interior space 1620. The front panel 1610 may include a movable shade 1612 within its interior 1614 that allows control of the amount of light passing further into the interior space 1620 by adjusting the position of the shade 1612. For example, the shade 1612 may be adjustable from fully open to fully closed. Alternatively, the shade 1612 may have a maximum closed position that still allows some radiation to enter the interior space 1620. Movement of the shade 1612 may be controlled by a controller 1616 that receives data from one or more sensor(s) 1618. A sensor 1618 may respond to demand for heat from a downstream system, the interior temperature of the space 1620, and/or another set of conditions.

The panel 1610 includes an innermost transparent or translucent wall 1622 that defines a focusing optical surface, such as a Fresnel lens. The inner wall 1622 is constructed from a relatively heat-resistant material. The panel arrangement is positioned and configured to direct a maximal degree of solar radiation (subject to adjustment of the shade 1612) onto a collector assembly 1640. The outer surface 1641 of this assembly may be transparent or translucent, while the inner surface 1643 may be opaque or otherwise heat-absorbing. Sandwiched therebetween is a heat transfer coil of tubes with an inlet 1642 and an outlet 1644. Fluid (e.g., potable water) is directed via a pump (not shown), which may be steady-state or variable in flow, through the tubes 1642 and 1644. The collector 1640 may be parallel to the outer panel 1610 or otherwise oriented to take advantage of any focusing effect of solar radiation therebetween.

As illustrated in FIG. 17, the system 1600 may include a set of reflective flaps 1710 at edges 1720 of the perimeter of the front panel 1610. In this example, there are four flaps 1710 located on respective edges 1720 of the rectangular panel 1610. These flaps 1710 are configured to move angularly on hinges provided at each perimeter edge 1720, so as to increase incident solar radiation within the panel structure. The Fresnel lens 1622 then enhances focus of this radiation onto the inner collector assembly 1640. The flaps 1710 may be fixed, based upon prevailing solar conditions and/or placement of the arrangement with respect to the sun. Alternatively, the flaps 1710 may be configured to move to track the sun based on data from one or more sensors 1732. Specifically, motion may be effected by rotary or linear actuators (not shown) under control of a controller 1730 that receives data from sensors 1732 (which may include a tracking sensor, a temperature sensor, and/or another kind of sensor). Where strong sunlight prevails through most of the year (e.g., in warm desert climates), some or all of the flaps 1710 may be omitted or reduced in size.

As illustrated in FIG. 16, the system 1600 may also include a burn chamber 1650. The burn chamber 1650 combusts fuel (e.g., oil, propane, natural gas, etc.) to enhance heating of the collector assembly 1640 when sunlight is reduced or unavailable. Thus, as in some embodiments described above, the system 1600 may provide continuous heated fluid output at a relatively steady state, in a single package, without requiring an external auxiliary combustion and/or electric heater. In some cases, the system 1600 may include multiple water/fluid coils and/or flap extenders. The system 1600 may omit the Fresnel lens 1622. The system 1600 may be ground mounted or provided on an elevated structure, such as a roof, tower, or post. The system 1600 may include a controller that reduces incident sunlight (via the shade and/or flaps) to control temperature and/or control the flow rate of the working fluid/water.

A system 1600 as described above allows for concentration of solar radiation onto a heating element to achieve higher temperatures in its fluid/water, adjustable temperature output, and a generally smaller unit size for a given output. In general, the fluid or water heated by the system 1600 may be directed to domestic uses and/or to heat an evaporator in a $CO_2$-based Rankine-type cycle power generation system as described above.

VIII. Valve and Refrigerant System

Figure 18:
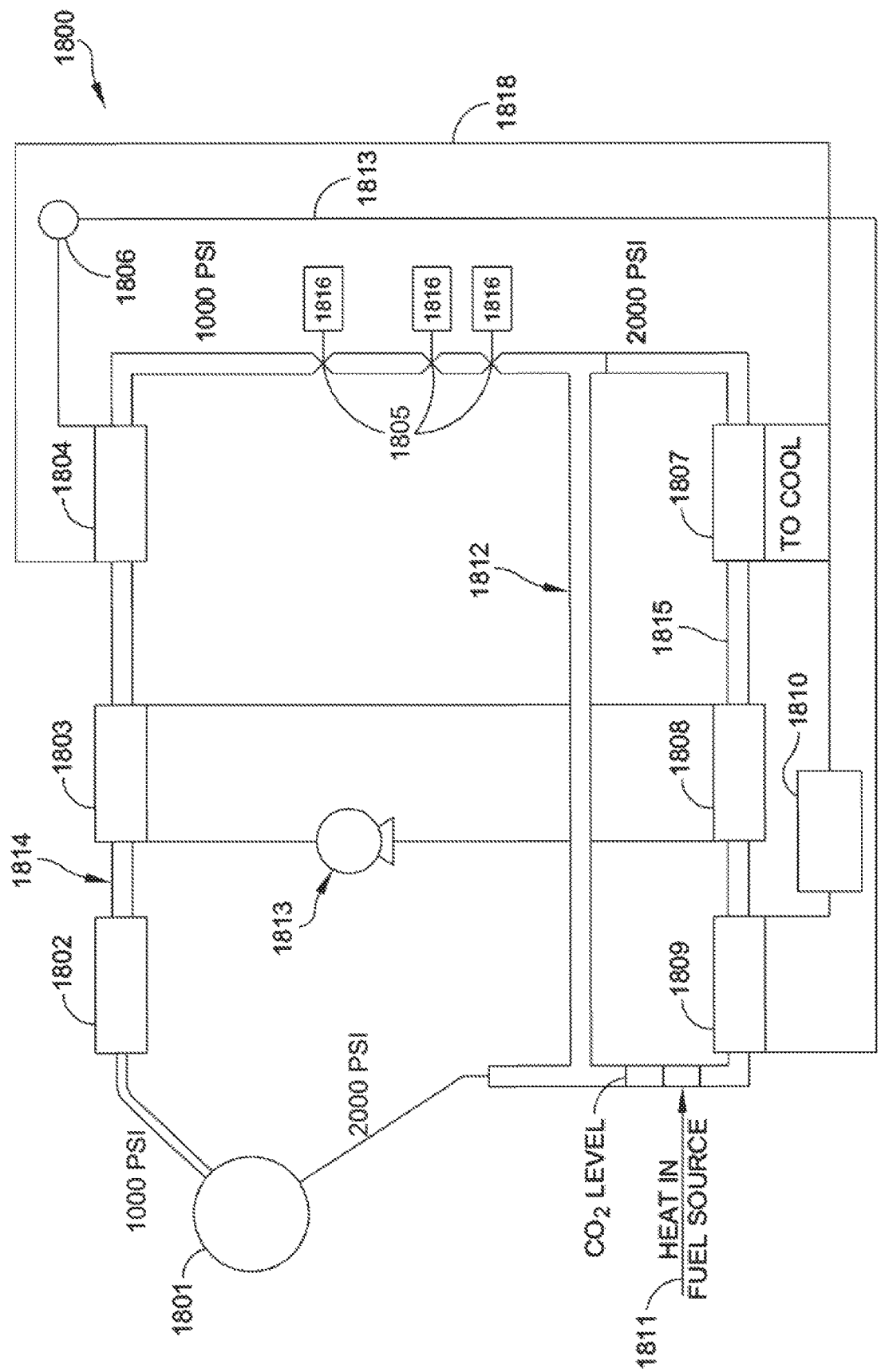
FIG. 18 is a block diagram of an example of a cogeneration system according to an embodiment.

FIG. 18 is a block diagram of an example of a cogeneration system 1800 according to an embodiment. Specifically, the cogeneration system 1800 is a $CO_2$-based cogeneration system that uses a valve system 1805 to increase the pressure of a liquid, by using chambers that equalize at different times. When each chamber equalizes, the liquid falls to the bottom and gas rises to the top. This cogeneration system 1800 also uses a refrigeration system, to allow the $CO_2$ to be brought below air/room temperature and consumer room temperature to generate electricity. In an embodiment, the system 1800 may include more or fewer components than the components illustrated in FIG. 18. The components illustrated in FIG. 18 may be local to or remote from each other. Multiple components may be combined into one apparatus. Operations described with respect to one component may instead be performed by another component. Some embodiments may use working fluid other than $CO_2$.

As illustrated in FIG. 18, a turbine or motor 1801 is configured to harness power from system 1800. $CO_2$ moves to a condenser 1814 and heat is extracted from the $CO_2$ through a heat exchanger 1802. The extracted heat is directed to a practical use, e.g. to heat a house, RV, car, boat, etc. $CO_2$ then passes through a heat exchanger 1803, which brings heat to a $CO_2$ evaporator 1815 through a heat exchanger 1808. The $CO_2$ leaves the heat exchanger 1803 to pass through another heat exchanger 1804, where a refrigeration cycle (described in further detail below) is used to extract heat below room temperatures. Liquid $CO_2$ then passes through the chambers of the valve system 1805. The chambers allow the liquid to drop and the gas to rise when each chamber equalizes. No two valves 1816 situated adjacent to each other (i.e., adjacent relative to the flow of the fluid) should be open at the same time. The valve system 1805 may include two or more valves 1816. In this example, there are three valves 1816. The more valves 1816 that are included, the less pressure differential will be present between neighboring chambers. The $CO_2$ that is colder than room temperature may then be heated by room temperature in an evaporator 1815, thereby cooling the room or space. The $CO_2$ then travels to heat exchanger 1808, where heat is brought in from the condenser 1814. The evaporator 1815 and the condenser 1814 may be associated with one or more heat exchangers. In this example, the heat exchanger 1807 introduces room-temperature air to heat the $CO_2$, whereas another heat exchanger 1802 pulls heat out of the $CO_2$, for example, to heat the air.

In an embodiment, after passing through the heat exchanger 1808, the $CO_2$ then moves to another heat exchanger 1809, which is the condenser for a refrigeration cycle that uses compressor 1806 and further uses heat exchanger 1804 as an evaporator. The $CO_2$ then travels back to the motor or pump 1801, past a heat source 1811 (e.g., from an open flame, hot water, and/or solar heat). A backflow vapor line 1812 allows the gas to travel back to the valve system 1805, where the high-pressure gas displaces the more dense liquid or transcritical fluid. A fluid (e.g., water, glycol refrigerant, etc.) flows through pump 1813, to send heat from heat exchanger 1803 to heat exchanger 1808 before returning to the pump 1813.

In the example of FIG. 18, the refrigeration cycle starts in compressor 1806 and passes to condenser heat exchanger 1809, which sends heat to $CO_2$. Refrigerant (e.g., R410a, R600, R134a, or another refrigerant) passes through heat exchanger 1810, allowing heat to be exhausted to the environment (i.e., an inside environment and/or an outside environment). Liquid refrigerant goes through a capillary tube or thermostatic expansion (TXV) type valve 1818 that restricts flow, to keep condenser pressure high. Liquid refrigerant then drops into the evaporator heat exchanger 1804, which extracts heat from $CO_2$. Refrigerant then passes back to the compressor 1806 to repeat the cycle. The condenser 1810 may include a fan (not shown), to extract more heat when necessary.

As illustrated in FIG. 18, the cogeneration system 1800 may not include any mechanical pump. Specifically, by selectively opening and closing the valves 1816, the cogeneration system 1800 may use the valve system 1805 to help move the $CO_2$ through the cycle without requiring a mechanical pump to do so. The valve system 1805 may use less energy and/or be less susceptible to breakage (e.g., blown seals) than a pump system. Thus, the cogeneration system 1800 may provide for cogeneration using techniques that are both quieter and more efficient than cogeneration systems that rely on pump mechanisms.

In the example described above, $CO_2$ is in different states at different locations in the cogeneration system 1800. While in the heat exchanger 1815, the $CO_2$ is heated and vaporized to use an expanded gas. As the $CO_2$ leaves the motor 1801, it enters another heat exchanger 1802, where it is condensed into a liquid or denser trans-critical fluid. The denser fluid drops through the chambers of the valve system 1805 as less dense fluid rises in the chambers.

Figure 19:
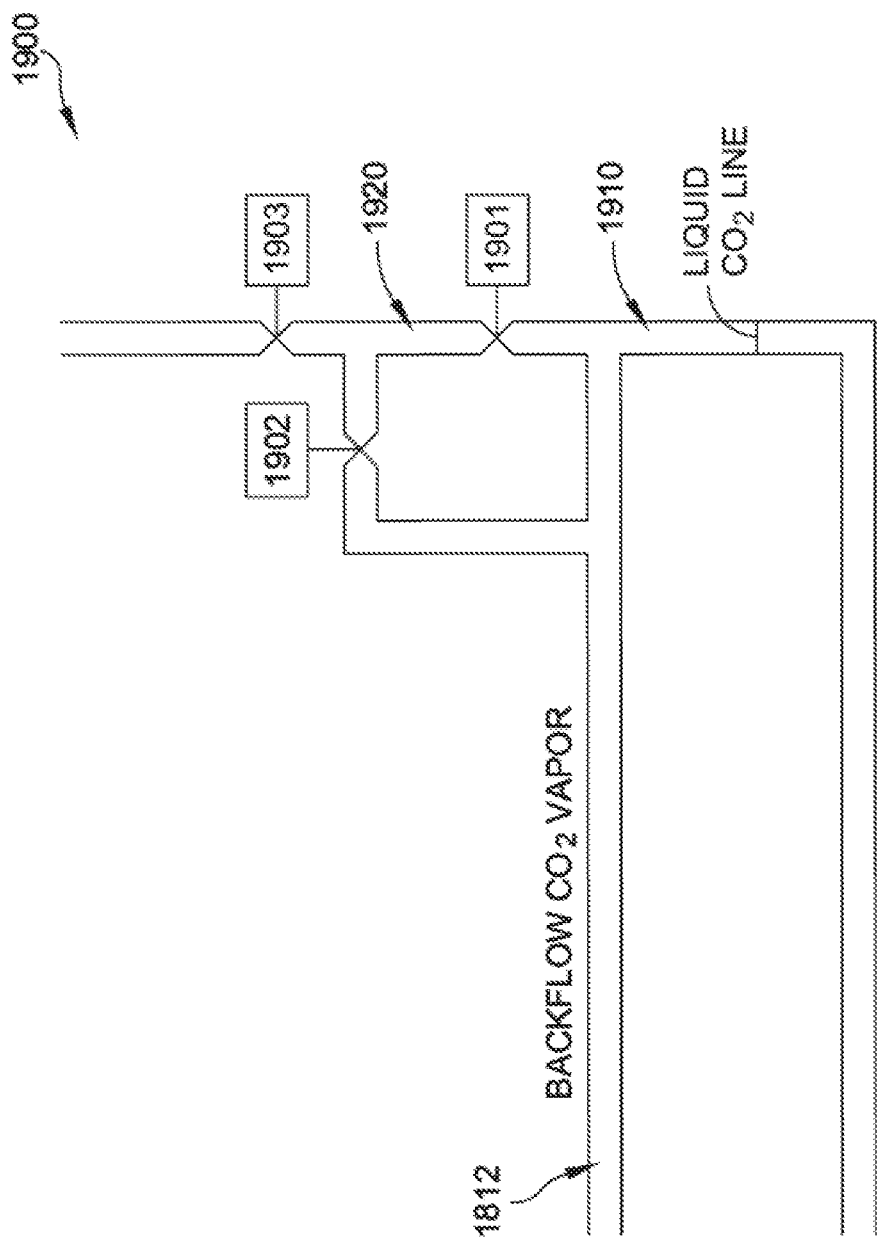
FIG. 19 is a block diagram of an example of a valve system according to an embodiment.

FIG. 19 is a block diagram of an example of a valve system 1900 according to an embodiment. Specifically, the valve system 1900 illustrated in FIG. 19 may be used in place of the valve system 1805 illustrated in FIG. 18. In an embodiment, the system 1900 may include more or fewer components than the components illustrated in FIG. 19. The components illustrated in FIG. 19 may be local to or remote from each other. Multiple components may be combined into one apparatus. Operations described with respect to one component may instead be performed by another component.

In the valve system 1900 illustrated in FIG. 19, valve 1901 opens at the same time as valve 1902, while valve 1903 remains closed. This approach allows the high-pressure vapor from the backflow line 1812 to push the liquid down into the evaporator chamber 1910. Valves 1901 and 1902 then close and valve 1903 opens, allowing liquid into the middle chamber 1920.

IX. Conclusion

Systems and methods described herein provide a highly efficient and effective approach to cogeneration of power and heat. Cogeneration approaches described herein may increase the efficiency of fuel-burning systems that are typically operated in the colder months, while maintaining the ability to continue generating power using solar heat when available (e.g., during warm months). By using $CO_2$ as a working fluid, such approaches provide high efficiency in heat transfer, while avoiding hazardous or toxic compounds often present in exotic cogeneration technology. Cogeneration systems and methods described herein may be applied to, and/or supplement existing functionality of, a variety of applications including, but not limited to, domestic heating, cooling and/or power generation, charging vehicles (e.g., electric vehicles, boats, and RVs), and/or improving efficiency of geothermal heat pump systems. Approaches described herein may use compact and adjustable solar collectors to acquire needed heat for generation processes. In addition, approaches described herein may be used in conjunction with a refrigeration cycle. Having the benefit of this disclosure, those skilled in the art will appreciate that many different applications are possible.

X. Miscellaneous

The foregoing has been a detailed description of illustrative embodiments. Various modifications and additions can be made without departing from the spirit and scope disclosed herein. Features of each of the various embodiments described above may be combined with features of other described embodiments as appropriate in order to provide a multiplicity of feature combinations in associated new embodiments. Furthermore, while the foregoing describes a number of separate embodiments and methods, what has been described herein is merely illustrative of the application of the principles of the present disclosure. For example, as used herein, the terms "process" and/or "processor" should be taken broadly to include a variety of electronic hardware and/or software-based functions and components (and can alternatively be termed functional "modules" or "elements").

Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein, various directional and dispositional terms such as "vertical," "horizontal," "up," "down," "bottom," "top," "side," "front," "rear," "left," "right," and the like are used only as relative conventions and not as absolute directions/dispositions with respect to a fixed coordinate space, such as the acting direction of gravity. Additionally, where the term "substantially," "approximately," "about," or another similar term, is employed with respect to a given measurement, value or characteristic, it refers to a quantity that is within a normal operating range to achieve desired results, but that includes some variability due to inherent inaccuracy and error within the allowed tolerances of the system (e.g., 1-5 percent). Accordingly, this description is meant to be taken only by way of example, and not to otherwise limit the scope of one or more embodiments.

In an embodiment, a system includes one or more devices, including one or more hardware processors, that are configured to perform any of the operations described herein and/or recited in any of the claims.

In an embodiment, a non-transitory computer-readable storage medium stores instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of scope, and what is intended by the Applicant to be the scope, is the literal and equivalent scope of the set of claims that issue from this application, in the specific form in which such claims issue, including any subsequent correction.

What is claimed is:

1. A system comprising:
   a conduit loop configured to carry a working fluid using a Rankine cycle;
   a valve system disposed along the conduit loop, comprising a plurality of valves configured to manage flow of the working fluid through a chamber; and
   a backflow vapor line disposed along the conduit loop, configured to direct working fluid in a gaseous state to the chamber, such that the working fluid in the gaseous state displaces working fluid in a liquid state in the chamber with the working fluid in the gaseous state and the working fluid in the liquid state bypassing each other in the chamber, and the working fluid in the liquid state advances through the conduit loop without requiring a mechanical pump.

2. The system of claim 1, further comprising:
   a heat source disposed along the conduit loop, configured to heat the working fluid to obtain the working fluid in the gaseous form.

3. The system of claim 1, further comprising:
   a heat exchanger disposed along the conduit loop, configured to exchange heat between the working fluid in the liquid form and ambient air.

4. The system of claim 1, wherein a vertically higher conduit loop comprises lower-pressure, more dense working fluid than a vertically lower conduit loop comprising higher-pressure, less dense working fluid.

5. The system of claim 1, wherein the valve system comprises at least two valves and at least two chambers.

6. The system of claim 1, wherein the practical use comprises heating one or more of a residence and/or a vehicle.

7. The system of claim 1, wherein the working fluid is carbon dioxide ($CO_2$).

8. The system of claim 1, further comprising a first heat exchanger disposed along the conduit loop, configured to extract heat from the working fluid and direct the heat to a practical use.

9. The system of claim 8, further comprising:
a second heat exchanger disposed along the conduit loop, configured to act as both (a) a condenser for the working fluid and (b) an evaporator for refrigerant in a refrigeration system.

10. The system of claim 9, further comprising:
a third heat exchanger disposed along the conduit loop, configured to act as a condenser for the refrigeration system.

* * * * *